(12) United States Patent
Wong

(10) Patent No.: US 11,979,240 B2
(45) Date of Patent: May 7, 2024

(54) METHODS AND COMMUNICATIONS DEVICES

(71) Applicant: Sony Group Corporation, Tokyo (JP)

(72) Inventor: Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/796,876

(22) PCT Filed: Mar. 5, 2021

(86) PCT No.: PCT/EP2021/055686
§ 371 (c)(1),
(2) Date: Aug. 2, 2022

(87) PCT Pub. No.: WO2021/197759
PCT Pub. Date: Oct. 7, 2021

(65) Prior Publication Data
US 2023/0054490 A1  Feb. 23, 2023

(30) Foreign Application Priority Data
Mar. 31, 2020  (EP) .................................... 20167439

(51) Int. Cl.
*H04L 1/00* (2006.01)
*H04L 1/1607* (2023.01)
*H04L 1/1829* (2023.01)

(52) U.S. Cl.
CPC .......... *H04L 1/1854* (2013.01); *H04L 1/1664* (2013.01); *H04L 1/1671* (2013.01)

(58) Field of Classification Search
CPC .... H04L 1/1854; H04L 1/1664; H04L 1/1671
See application file for complete search history.

(56) References Cited

U.S. PATENT DOCUMENTS

| 2019/0349917 A1 | 11/2019 | Huang et al. |
| 2022/0279538 A1* | 9/2022 | Jung ..................... H04L 5/0044 |

(Continued)

OTHER PUBLICATIONS

International Search Report and Written Opinion dated May 21, 2021, received for PCT Application PCT/EP2021/055686, filed on Mar. 5, 2021, 13 pages.

(Continued)

*Primary Examiner* — Christine T. Tu
(74) *Attorney, Agent, or Firm* — XSENSUS LLP

(57) ABSTRACT

A method of operating a device in a wireless network comprising transmitting a first uplink signal comprising control information in a set of uplink resources, transmitting a second uplink signal, wherein the second uplink signal is to be transmitted a plurality of times, each of the plurality of transmissions of the second uplink signal being a repetition of the second uplink signal, wherein each repetition of the second uplink signal is to be transmitted in a different set of uplink resources to the other repetitions of the second uplink signal, determining that the resources of the first uplink signal at least partially overlap in time with the resources of at least one of the repetitions of the second uplink signal, multiplexing the control information into the resources of a selected one or more of the repetitions of the second uplink signal, and transmitting the multiplexed signal to the wireless network.

20 Claims, 18 Drawing Sheets

(56) References Cited

U.S. PATENT DOCUMENTS

2022/0407641 A1* 12/2022 Xiong .................. H04L 1/1854
2023/0164788 A1* 5/2023 Yamamoto ............ H04L 1/0009
370/329

OTHER PUBLICATIONS

3GPP, "NR; Physical layer procedures for control (Release 16)", 3GPP TS 38.213 V16.0.0, Dec. 2019, pp. 1-146.
Holma et al., "LTE for UMTS OFDMA and SC-FDMA Based Radio Access", John Wiley & Sons, 2009, pp. 25-27.
Huawei et al., "Corrections on PUSCH enhancement", 3GPP TSG RAN WG1 #100-e, R1-2001028, Feb. 24-Mar. 6, 2020, 9 pages.
Nokia et al., "Summary of email discussion [100e-NR-L1enh_URLLC-PUSCH_Enh-01] (AI 7.2.5.3)", 3GPP TSG-RAN WG1 Meeting #100-e, R1-2001401, Feb. 24-Mar. 6, 2020, pp. 1-42.
Huawei et al., "New WID: Physical Layer Enhancements for NR Ultra-Reliable and Low Latency Communication (URLLC)", 3GPP TSG RAN Meeting #83, RP-190726, Mar. 18-21, 2019, 5 pages.
Samsung, "Remaining issues for PUSCH", 3GPP TSG RAN WG1 #100-e, R1-2000627, Feb. 24-Mar. 6, 2020, 6 pages.
3GPP, "Study on Scenarios and Requirements for Next Generation Access Technologies; (Release 14)", 3GPP TR 38.913 V14.3.0, Jun. 2017, pp. 1-39.
3GPP, "NR; Physical layer procedures for control (Release 15)", 3GPP TS 38.213 V15.8.0, Dec. 2019, pp. 1-109.
3GPP, "NR; Multiplexing and channel coding (Release 16)", 3GPP TS 38.212 V16.0.0, Dec. 2019, pp. 1-145.

* cited by examiner

METHODS AND COMMUNICATIONS DEVICES

CROSS-REFERENCE TO RELATED APPLICATIONS

The present application is based on PCT filing PCT/EP2021/055686, filed Mar. 5, 2021, which claims priority to EP 20167439.7, filed Mar. 31, 2020, the entire contents of each are incorporated herein by reference.

BACKGROUND

Field of Disclosure

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to routinely and efficiently support communications with an ever increasing range of devices associated with a wider range of data traffic profiles and types than existing systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) systems/new radio access technology (RAT) systems, as well as future iterations/releases of existing systems, to efficiently support connectivity for a wide range of devices associated with different applications and different characteristic data traffic profiles and requirements.

One example of a new service is referred to as Ultra Reliable Low Latency Communications (URLLC) services which, as its name suggests, requires that a data unit or packet be communicated with a high reliability and with a low communications delay. Another example of a new service is Enhanced Mobile Broadband (eMBB) services, which are characterised by a high capacity with a requirement to support up to 20 Gb/s. URLLC and eMBB type services therefore represent challenging examples for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device in a wireless communications network. The method comprises determining that the communications device should transmit a first uplink signal comprising control information to the wireless communications network in a set of uplink resources of a wireless access interface, determining that the communications device should transmit a second uplink signal to the wireless communications network, wherein the second uplink signal is to be transmitted a plurality of times, each of the plurality of transmissions of the second uplink signal being a repetition of the second uplink signal, wherein each repetition of the second uplink signal is to be transmitted in a different set of uplink resources of the wireless access interface to the other repetitions of the second uplink signal, determining that the resources of the first uplink signal at least partially overlap in time with the resources of at least one of the repetitions of the second uplink signal, multiplexing the control information into the resources of a selected one or more of the repetitions of the second uplink signal, and transmitting the multiplexed signal to the wireless communications network. Here, a characteristic of the resources of the selected one or more repetitions of the second uplink signal satisfies a predetermined condition.

Embodiments of the present technique, which, in addition to methods of operating communications devices, relate to methods of operating infrastructure equipment, communications devices and infrastructure equipment, and circuitry for communications devices and infrastructure equipment, allow for more efficient use of radio resources by a communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
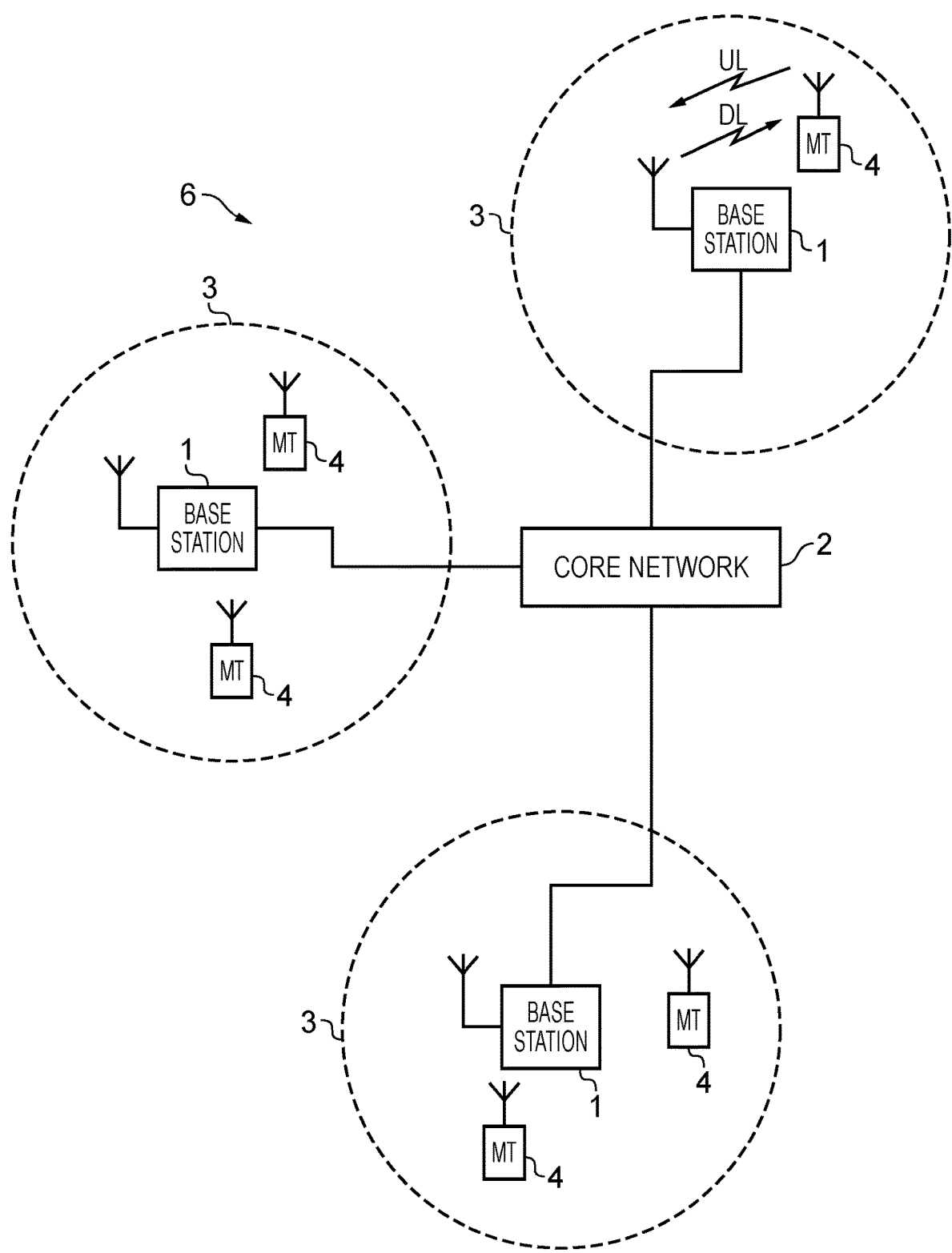
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
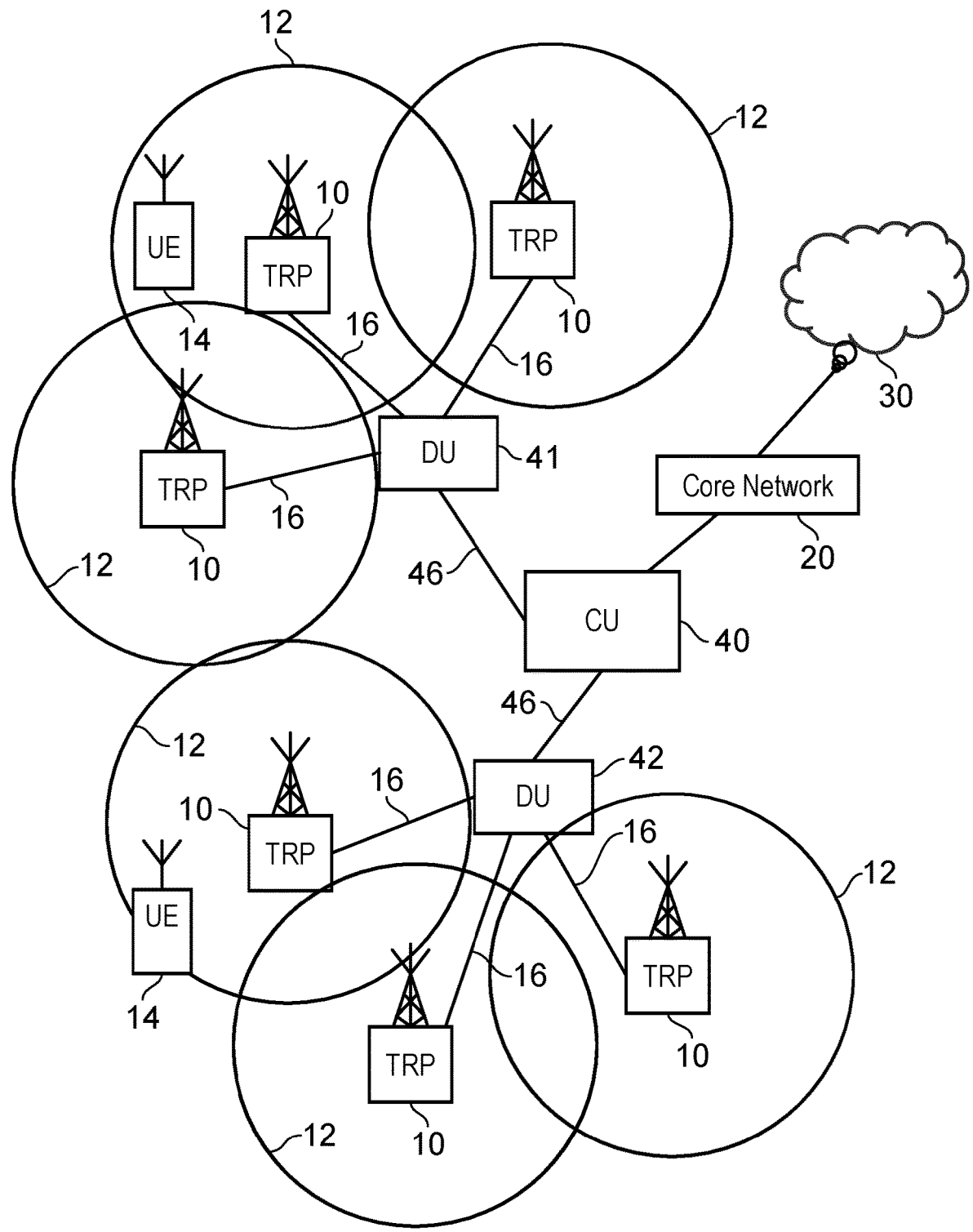
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
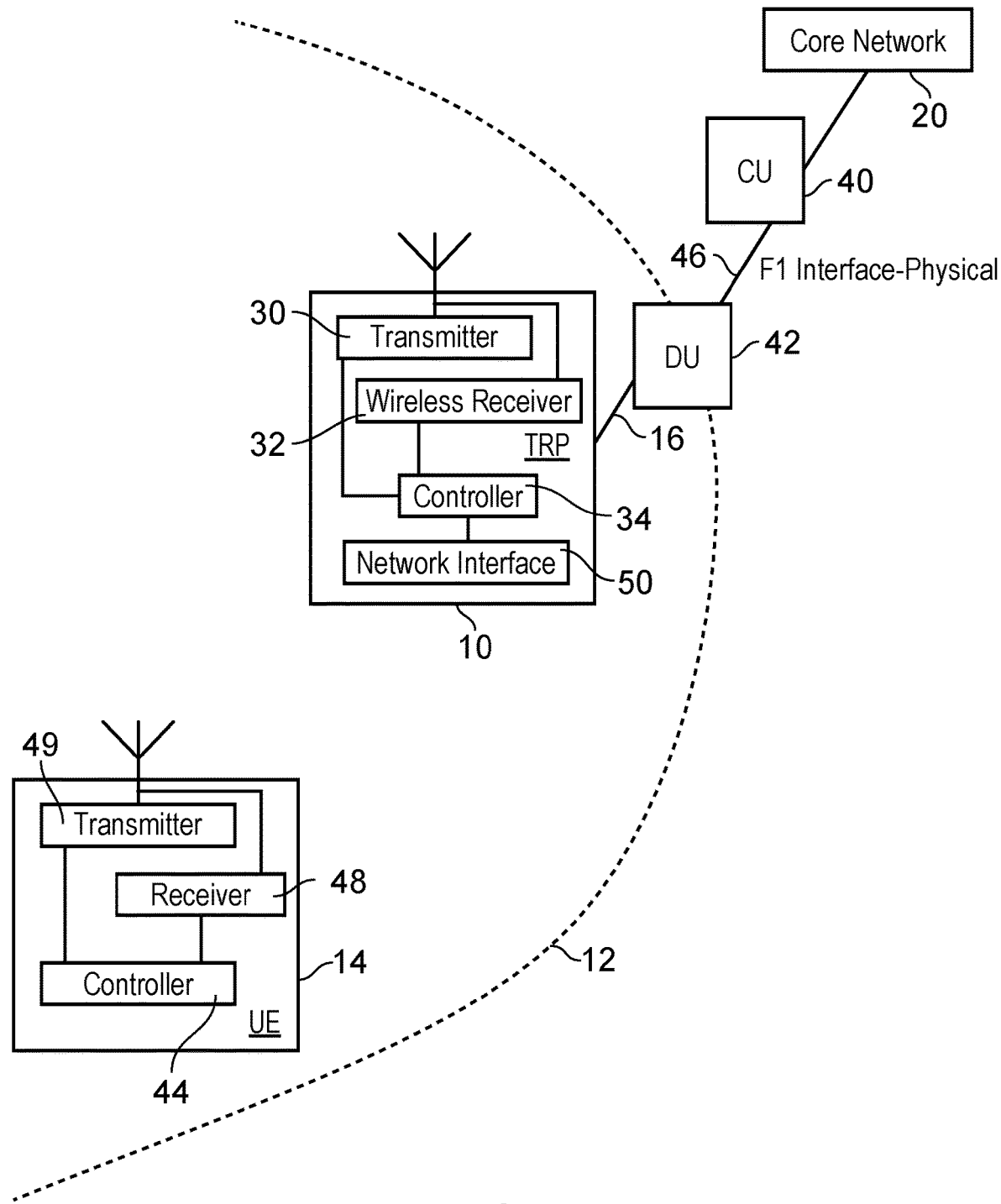
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

5G and eURLLC

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable and Low Latency Communications (URLLC) services are for a reliability of $1\text{-}10^{-5}$ (99.999%) or higher for one transmission of a 32 byte packet is required to be transmitted from the radio protocol layer ⅔ SDU ingress point to the radio protocol layer ⅔ SDU egress point of the radio interface within 1 ms with a reliability of 99.999% to 99.9999% [2]. Massive Machine Type Communications (mMTC) is another example of a service which may be supported by NR-based communications networks. In addition, systems may be expected to support further enhancements related to Industrial Internet of Things (IIoT) in order to support services with new requirements of high availability, high reliability, low latency, and in some cases, high-accuracy positioning.

Enhanced URLLC (eURLLC) [3] specifies features that require high reliability and low latency, such as factory automation, transport industry, electrical power distribution, etc. It should be appreciated that the Uplink Control Information (UCI) for URLLC and eMBB will have different requirements. Hence, one of the current objectives of eURLLC is to enhance the UCI to support URLLC, where the aim is to allow more frequent UCI to be transmitted, such as the transmission of more Hybrid Automatic Repeat Request Acknowledgement (HARQ-ACK) feedback per slot, and to support multiple HARQ-ACK codebooks for different traffic services. Solutions identified to accommodate more frequent UCI without interrupting the high-priority and low-latency data transmissions using Physical Uplink Shared Channels (PUSCHs) can comprise the multiplexing of UCI onto PUSCH repetitions.

Rel-15 UCI and PUSCH Multiplexing

A PUCCH carries Uplink Control Information (UCI), such as HARQ-ACK feedback for PDSCH, Scheduling Requests (SRs) and Channel State Information (CSI). There are 5 PUCCH formats, namely Format 0, 1, 2, 3 and 4. PUCCH Format 0 carries up to 2 HARQ-ACK bits and a positive SR. PUCCH Format 1 carries up to 2 bits of information which can be either 2 HARQ-ACK bits or 1 HARQ-ACK and 1 SR bit. PUCCH Formats 2, 3 and 4 can carry more than 2 bits, which can consist of HARQ-ACK, SRs and CSI. It should be noted that HARQ-ACK is a term of art used to describe HARQ feedback for a PDSCH, where despite the name the feedback itself can be either a positive acknowledgement (termed "ACK") or a negative acknowledgement (termed "NACK").

A HARQ-ACK feedback is transmitted to the gNB, in response to Physical Downlink Shared Channel (PDSCH) scheduling, to inform the gNB whether the UE has successfully decoded the PDSCH or not. For a PDSCH ending in slot n, the corresponding PUCCH carrying the HARQ-ACK is transmitted in slot $n+K_1$, where the value of $K_1$ is indicated in the field "PDSCH-to-HARQ_feedback timing indicator" of the DL Grant (carried by Downlink Control Information (DCI) Format 1_0 or DCI Format 1_1). The PUCCH resource used is indicated in the "PUCCH Resource Indicator" (PRI) field of the DL Grant.

Figure 4:
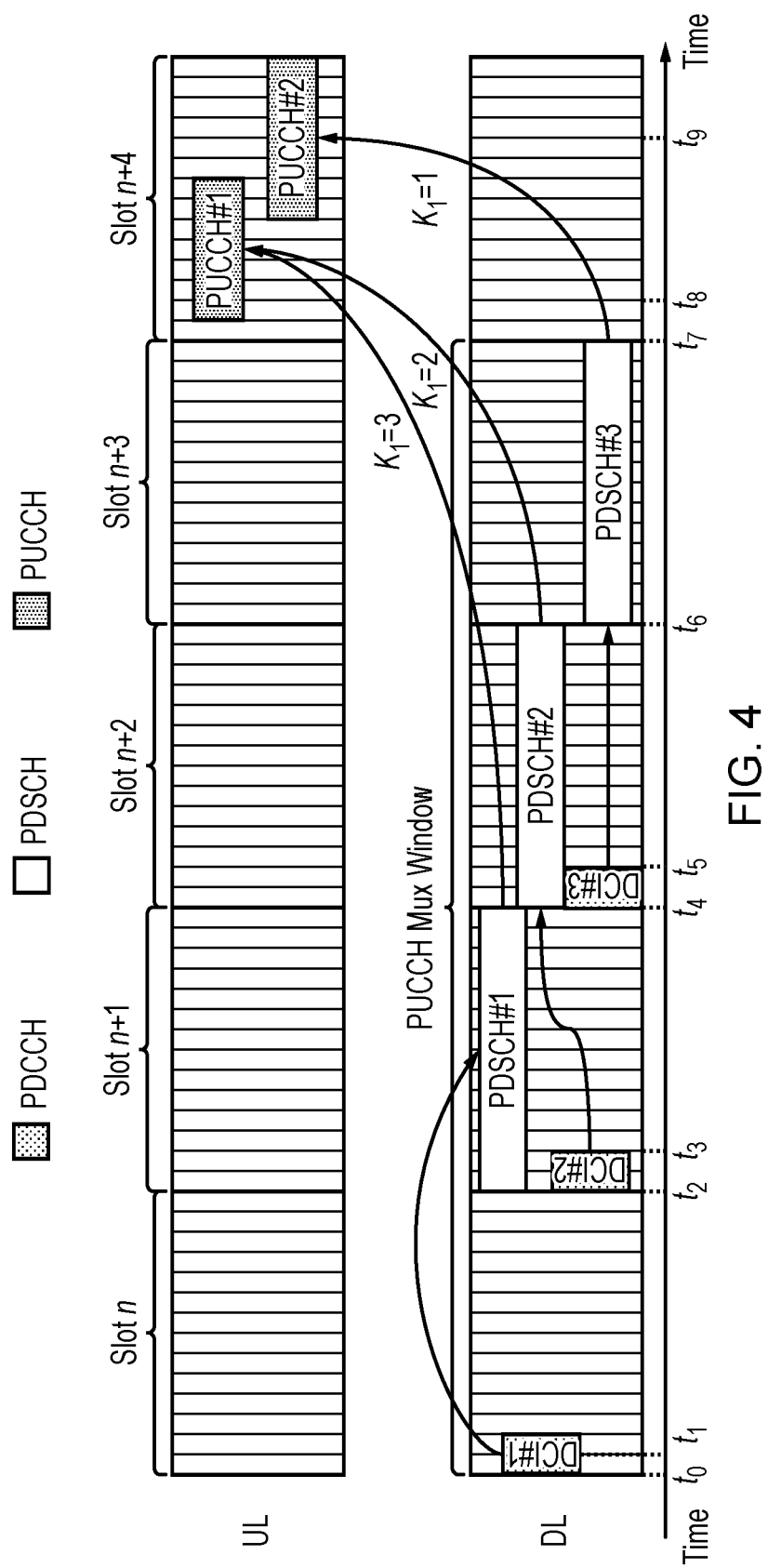
FIG. 4 shows a flow diagram illustrating a process of how a User Equipment (UE) may multiplex multiple Hybrid Automatic Repeat Request Acknowledgements (HARQ-ACKs) into a single Physical Uplink Control Channel (PUCCH)

Multiple (different) PDSCHs can point to the same slot for transmissions of their respective HARQ-ACKs and the bits of these HARQ-ACKs (in the same slot) are then multiplexed by the UE into a single PUCCH, where the PUCCH resource is determined by the DL Grant scheduling the last PDSCH. Hence, a PUCCH can contain multiple HARQ-ACKs for multiple PDSCHs. An example is shown in FIG. 4, in which three DL Grants are transmitted to the UE via DCI #1, DCI #2 and DCI #3 in slot n, n+1 and n+2 respectively. DCI #1, DCI #2 and DCI #3 schedule PDSCH #1, PDSCH #2 and PDSCH #3 respectively. DCI #1, DCI #2 and DCI #3 further indicate $K_1=3$, $K_1=2$ and $K_1=1$ respectively. Since the $K_1$ values indicate that the HARQ-ACK feedbacks for PDSCH #1, PDSCH #2 and PDSCH #3 are all transmitted in slot n+4, the UE multiplexes all three of these HARQ-ACKs into a single PUCCH. The PUCCH Multiplexing Window is a time window during which PDSCHs can be multiplexed into that single PUCCH, where this PUCCH Multiplexing Window depends on the range of $K_1$ values. In the example shown by FIG. 4, the PUCCH Multiplexing Window is from Slot n to Slot n+3, which means the max $K_1$ value is 4 slots.

CSI reports can be configured to be periodic, aperiodic or semi-persistent, and can be carried by either a PUCCH or a PUSCH; that is, UCI can be transmitted using a PUSCH. Periodic CSI is transmitted using PUCCH, where the CSI report is sent periodically. Aperiodic CSI is transmitted using PUSCH and is triggered by a CSI Request field in the UL Grant, where only a single CSI report is sent. In semi-persistent CSI, the CSI report is sent periodically once it is activated by lower layers and is stopped when deactivated by lower layers. Semi-persistent CSI can be configured to transmit on PUSCH or PUCCH, where semi-persistent CSI on PUSCH is activated and deactivated by DCI whilst semi-persistent on PUCCH is activated and deactivated by MAC Control Element (CE).

In Rel-15, when a PUCCH carrying CSI collides with another PUCCH carrying HARQ-ACK with or without SR, the UE multiplexes the CSI and HARQ-ACK/SR if the RRC parameter "simultaneousHARQ-ACK-CSI" is set to TRUE. Otherwise the UE drops the CSI. This parameter is part of the PUCCH configuration and hence is applicable to all PUCCH transmissions in the UE. The PUCCH resource used to transmit the multiplexed UCI (CSI and HARQ-ACK/SR) is selected from all the overlapping PUCCHs.

When a PUCCH carrying UCI collides with a PUSCH, then the UCI from the PUCCH is multiplexed into the PUSCH. It should be noted that SRs are generally not multiplexed into a PUSCH since it is more effective to either transmit the data on the PUSCH anyway (after all, a SR is a simply request for PUSCH resource) or send the Buffer Status Report (BSR) in the PUSCH.

There are two aspects for UCI multiplexing onto PUSCH; the timing criteria of the colliding PUCCH and PUSCH, and the PUSCH resources used for the UCI.

Timing Criteria for UCI Multiplexing

Figure 5:
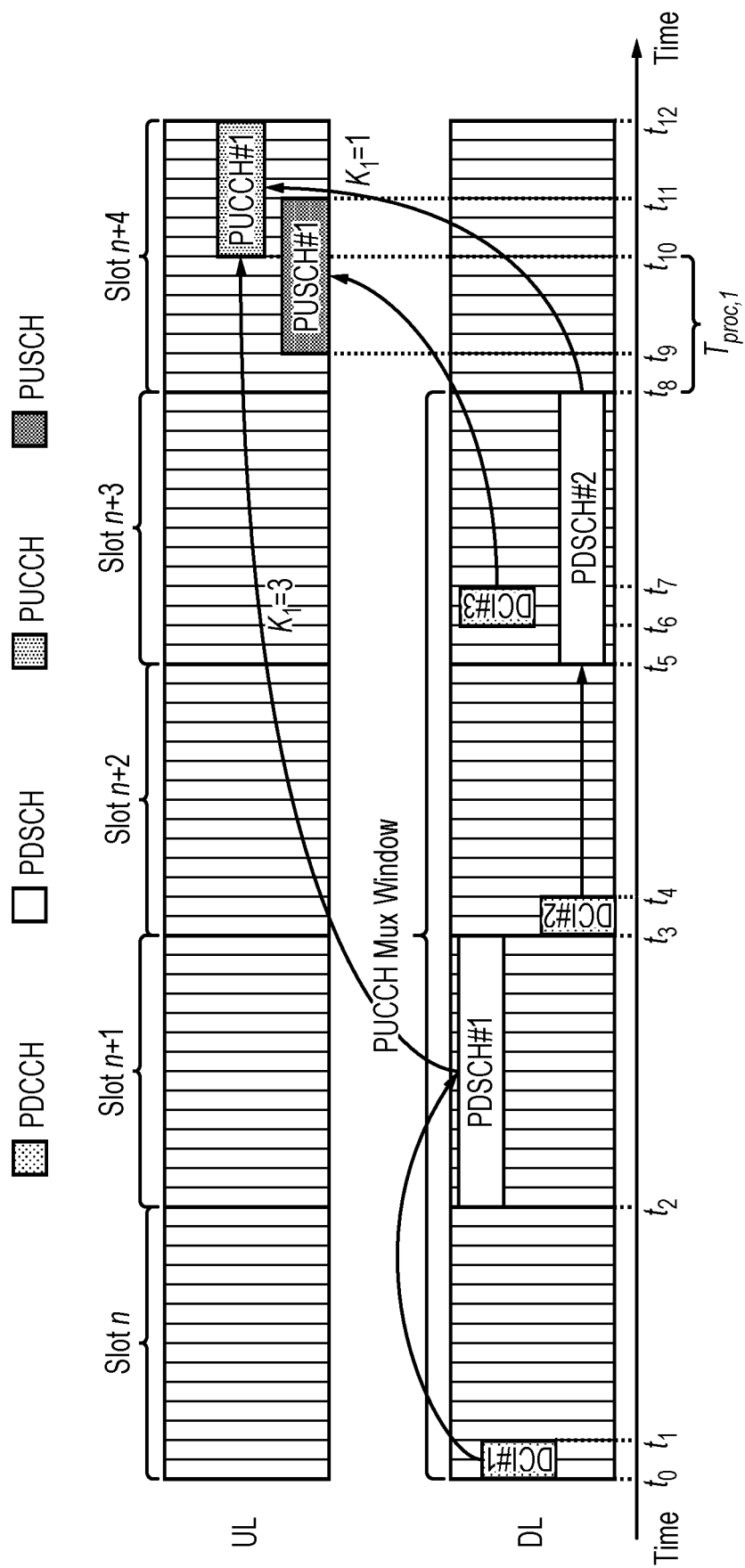
FIG. 5 shows an example of the timing criteria for a Physical Downlink Shared Channel (PDSCH) with respect to a processing time, $T_{proc,1}$ at a UE.

When one or more PUCCH collide with one or more PUSCH, the UCI from the PUCCH is multiplexed into the PUSCH if these colliding channels meet the PDSCH and PUSCH timing criteria (also referred to as timeline criteria) as follows:

For a PUCCH carrying HARQ-ACK colliding with a PUSCH, the earliest PUSCH or PUCCH in the collision starts after $T_{proc,1}$ from the end of the last PDSCH in the PUCCH multiplexing window. $T_{proc,1}$ is the time the UE takes to process a PDSCH. An example is shown in FIG. 5, where DCI #1 and DCI #2 are DL Grants (DCI Format 1_0 or DCI Format 1_1), scheduling PDSCH #1 and PDSCH #2 respectively.

For a PDSCH ending in slot n, the corresponding PUCCH carrying the HARQ-ACK is transmitted in slot n+$K_1$, where the value of $K_1$ is indicated in the field "PDSCH-to-HARQ_feedback timing indicator" of the DL Grant. In this example, the PUCCHs carrying the HARQ-ACK for PDSCH #1 and PDSCH #2 are both in Slot n+4 at time $t_{10}$ to $t_{12}$, and so the HARQ-ACK bits for both PDSCH #1 and PDSCH #2 are multiplexed into PUCCH #1. The PUCCH Multiplexing Window contains all the PDSCHs sharing the same PUCCH for their HARQ-ACK feedbacks. At time $t_6$, an UL Grant carried by DCI #3 schedules PUSCH #1 to transmit at time $t_9$ to $t_{11}$, thereby colliding with PUCCH #1. According to the timing criteria, PUSCH #1 (the earliest and only PUSCH in the collision) starts before the end of $T_{proc,1}$ of PDSCH #2 and so does not meet the timing criteria and therefore the UCI from PUCCH #1 cannot be multiplexed into PUSCH #1. This is because the UE does not have sufficient time to process PDSCH #2 in time to multiplex the HARQ-ACK into PUSCH #1.

Figure 6:
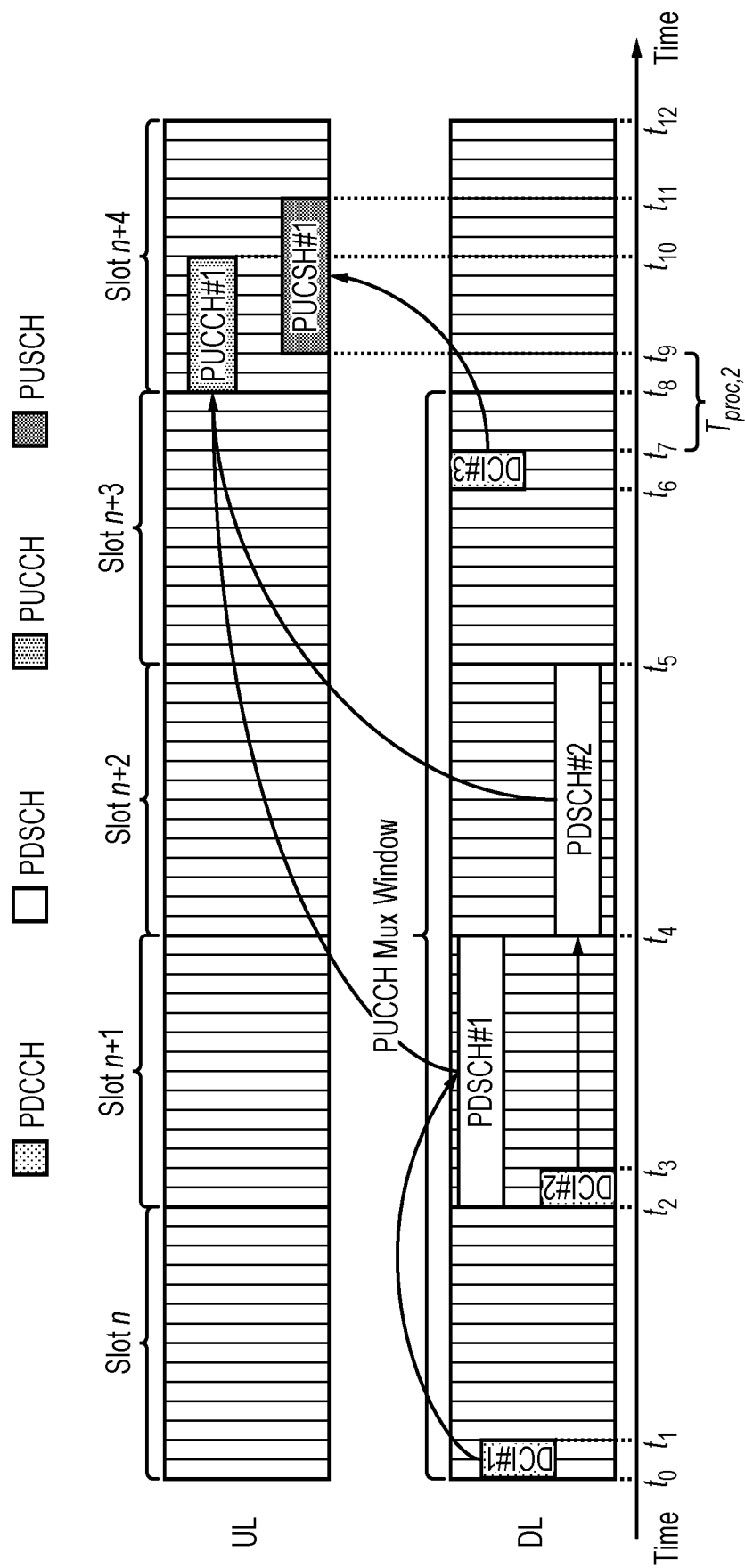
FIG. 6 shows an example of the timing criteria for an Uplink Grant with respect to a processing time, $T_{proc,2}$ at a UE.

The earliest PUCCH or PUSCH in the collision, starts after $T_{proc,2}$ from the last UL Grant scheduling one of the PUSCH in the collision, where $T_{proc,2}$ is the time the UE takes to process the PUSCH. An example is shown in FIG. 6, where DCI #1 and DCI #2 are DL Grants scheduling PDSCH #1 and PDSCH #2 respectively. The corresponding HARQ-ACKs for these PDSCHs are carried by PUCCH #1 scheduled at time $t_8$ to $t_{10}$. At time $t_6$, an UL Grant carried by DCI #3 schedules PUSCH #1 at time $t_9$ to $t_{11}$, thereby colliding with PUCCH #1. According to the time criteria, PUCCH #1 starts within $T_{proc,2}$ of DCI #3 and so the UCI from PUCCH #1 cannot be multiplexed into PUSCH #1.

In Rel-15, the UE does not expect the gNB to schedule its PDSCH, PUSCH and PUCCH such that they violate the timing criteria for UCI multiplexing onto PUSCH.

PUSCH Resource for UCI Multiplexing

In Rel-15, when UCI carried by PUCCH (or CSI carried by PUSCH) collides with PUSCH carrying data, the UCI bits and data bits are multiplexed and transmitted on the PUSCH. The multiplexing is done by piggybacking the UCI onto the PUSCH resource, i.e. some of the allocated PUSCH resources are used to carry the UCI, which will reduce the resources for the PUSCH data. The HARQ-ACK bits are multiplexed first, and are followed by CSI bits. The number of resources (i.e. Resource Elements) that can be used is determined by two parameters, an offset $\beta_{PUSCH}$ and a scaling factor $\alpha$. The $\beta_{PUSCH}$ offset is signalled by the DCI carrying the UL Grant for the PUSCH using the "beta_offset indicator" field, which indicates one of four configured $\beta_{PUSCH}$ offset values. These four $\beta_{PUSCH}$ offset values are selected from a table which is defined in [4], where the minimum value is 1, i.e. $\beta_{PUSCH} \geq 1$. The scaling factor $\alpha = \{0.5, 0.65, 0.8, 1\}$ is RRC configured, and this scaling factor sets the maximum number of REs (Resource Elements) as a percentage of the number of PUSCH REs that can be used for UCI.

Figure 7:
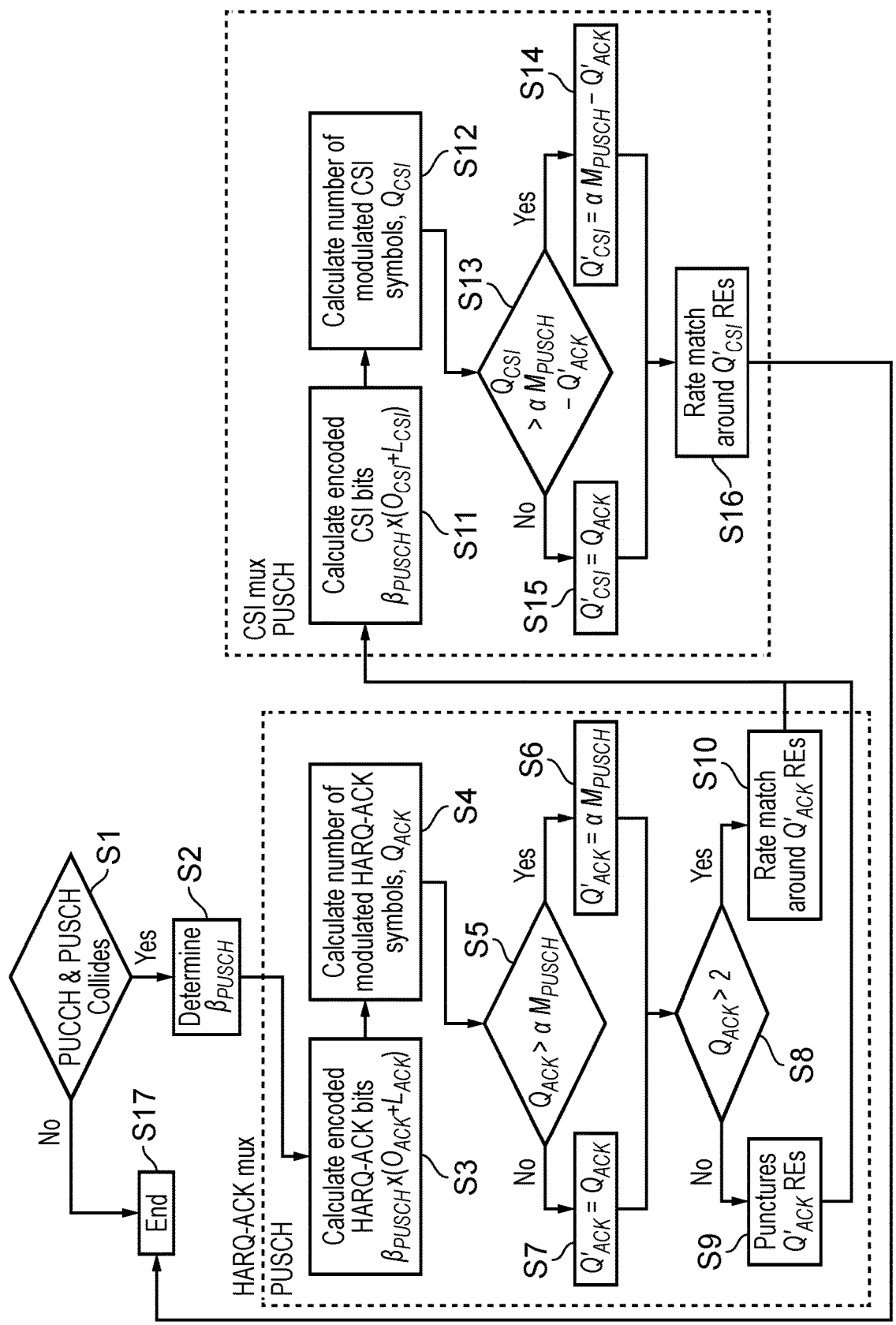
FIG. 7 shows an example of how a UE may multiplex Uplink Control Information (UCI) onto a Physical Uplink Shared Channel (PUSCH)

The multiplexing procedure is summarised in the flow chart in FIG. 7. When a PUCCH and PUSCH collide, which is determined in step S1, the UE calculates in step S3 the number of HARQ-ACK bits $O_{ACK}$ and the number of CRC bits $L_{ACK}$. This is then multiplied by the $\beta_{PUSCH}$ indicated in the UL Grant (and determined by the UE in step S2) to determine the total bits required to carry these HARQ-ACKs. The $\beta_{PUSCH}$ offset is effectively the level of redundancies used for the HARQ-ACKs information. The UE then calculates in step S4 the number of modulated symbols $Q_{ACK}$ (where the modulation used depends on the scheduled PUSCH) and hence the number of REs (Resource Element) required. The UE then determines the maximum allowed PUSCH REs that can be used for UCI by multiplying the scaling factor $\alpha$ with the number of PUSCH REs $M_{PUSCH}$. The UE checks in step S5 that $Q_{ACK}$ does not exceed this maximum REs and if it does (i.e. $Q_{ACK} > \alpha M_{PUSCH}$) then the actual number of REs that can be used, as is determined by the UE in step S6, $Q'_{ACK} = \alpha M_{PUSCH}$. Otherwise the actual number of REs is the calculated number of REs, i.e. $Q'_{ACK} = Q_{ACK}$, and is determined so by the UE in step S7. The UE then piggybacks the $Q'_{ACK}$ HARQ-ACK modulated symbols to the PUSCH where puncturing is used in step S9 for $O_{ACK} \leq 2$ bits (which the UE checks in step S8), otherwise the PUSCH data symbols are rate matched in step S510 around $Q'_{ACK}$ symbols.

This process is then repeated for the CSI, i.e. UE calculates in step S11 the number of CSI bits $O_{CSI}$ and its CRC $L_{CSI}$ and multiply it with the offset $\beta_{PUSCH}$. The UE determines in step S12 the number of modulated symbols $Q_{CSI}$ and hence the number of REs required to carry the CSI. The UE then checks in step S13 that $Q_{CSI}$ does not exceed the remaining PUSCH REs ($\alpha M_{PUSCH} - Q'_{ACK}$), and if it does (i.e. $Q_{CSI} > \alpha M_{PUSCH} - Q'_{ACK}$) then the actual number of REs for CSI $Q'_{CSI}$ takes up the remaining PUSCH REs in step S14, i.e. $Q'_{cv} = \alpha M_{PUSCH} - Q'_{ACK}$ Otherwise, as determined by the UE in step S15, $Q'_{CSI}$ is the calculated number of CSI REs, i.e. $Q'_{CSI} = Q_{CSI}$. For CSI, only rate matching is used, i.e. the PUSCH data is rate matched in step S16 around the $Q'_{CSI}$ modulated symbols. It should be noted that the CSI UCI may consists of two types, i.e. Type 1 CSI and Type 2 CSI, the multiplexing process is performed on Type 1 CSI first followed by Type 2 CSI. The process then ends in step S17.

The UCI-onto-PUSCH multiplexing priorities HARQ-ACK bits followed by Type 1 CSI and finally Type 2 CSI. It should be noted that if there are not sufficient REs in the PUSCH, then part of the CSI bits are multiplexed, and if there are no REs left, the CSI may not be multiplexed.

PUSCH Repetition

Figure 8:
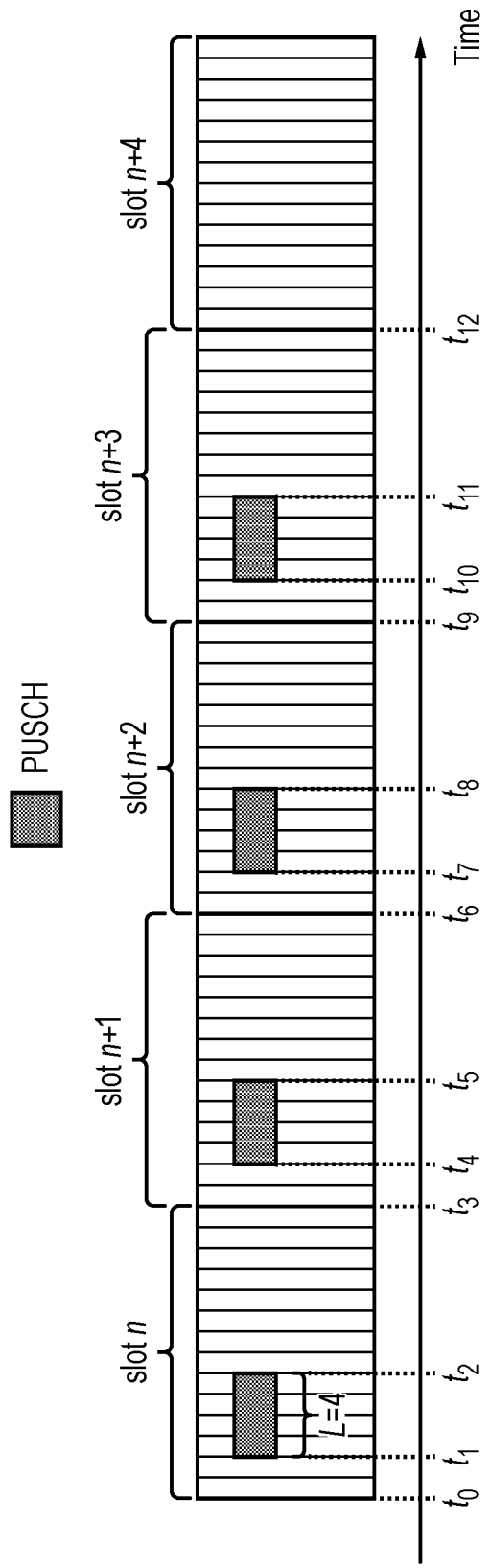
FIG. 8 illustrates an example of PUSCH Aggregation in Rel-15.

In Rel-15, slot based PUSCH repetition, known as PUSCH Aggregation, is introduced to improve the reliability of the PUSCH transmission. An example is shown in FIG. 8, where a PUSCH of 4 symbols duration, i.e. L=4, which starts with 2 symbols offset from the slot boundary is repeated 4 times, i.e. K=4, using PUSCH Aggregation starting from slot n to slot n+3. The number of repetitions for PUSCH Aggregation is RRC configured.

Figure 9:
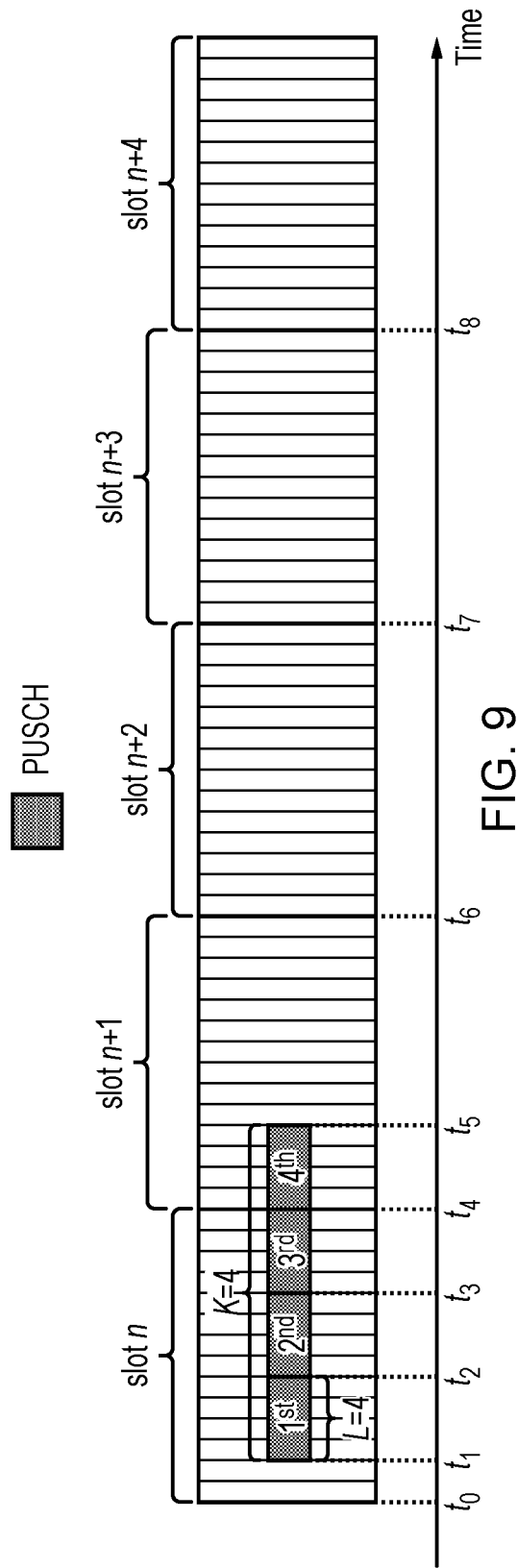
FIG. 9 illustrates an example of PUSCH Repetitions in Rel-16.

In PUSCH Aggregation, i.e. the slot based PUSCH repetition, where the PUSCH duration is less than a slot, time gaps between repetitions are observed. For the example in FIG. 8, the PUSCH is repeated at the slot level leaving a gap of 10 symbols between successive repetitions. Such gaps introduce latency and are not acceptable for URLLC, where low latency is of high importance. Recognising this, in Rel-16 eURLLC, PUSCH Repetitions are introduced where the PUSCH repetitions are repeated back-to-back, thereby minimising latency whilst improving reliability. An example is shown in FIG. 9, where a 4 symbol duration PUSCH, L=4, with 2 symbols offset from the slot boundary, is repeated 4 times, i.e. $K_N$=4, using Rel-16 PUSCH Repetition. Here, there are no gaps between each repetition, thereby completing the entire repetitions within 16 symbols compared to 56 symbols (4 slots) when using PUSCH Aggregation. The number of repetitions in the Rel-16 PUSCH is scheduled by the UL Grant and is only applicable for PUSCH mapping Type B (i.e. a PUSCH that can start at any symbol within a slot).

Figure 10:
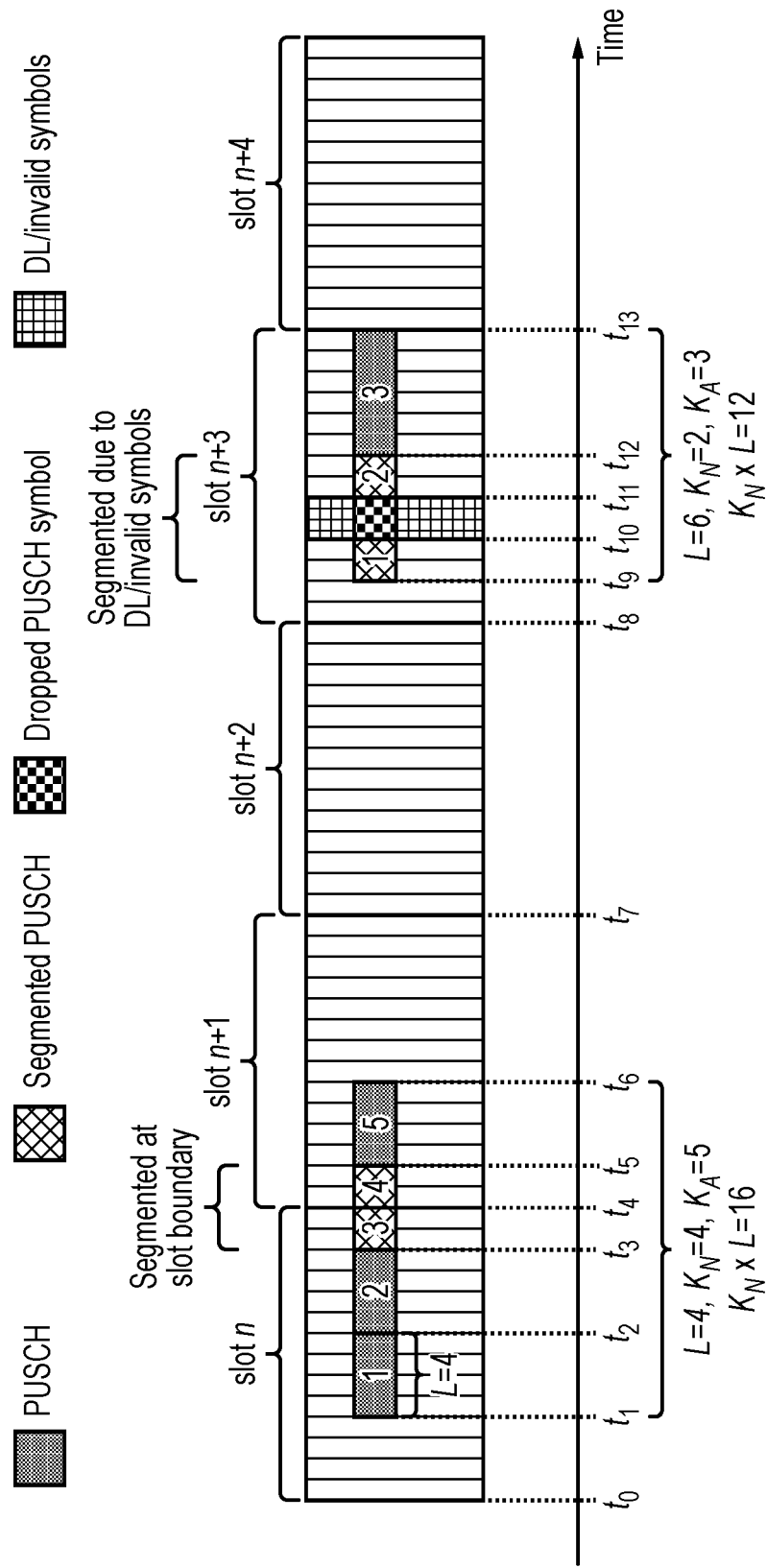
FIG. 10 illustrates an example of PUSCH segmentation.

Since PUSCH mapping Type B can start at any symbol within a slot, some of its repetitions may cross slot boundary or collide with an invalid OFDM symbol, e.g. a Downlink symbol and these PUSCHs are segmented. A PUSCH repetition that is scheduled e.g. by an UL Grant is known as a nominal repetition and if segmentation occurs on a nominal PUSCH into two or more PUSCH segments, these segments are called actual repetitions $K_A$, i.e. actual repetitions are PUSCH repetitions that is actually transmitted which can be larger than the number of nominal repetitions, i.e. scheduled number of repetitions. The PUSCH duration L and nominal repetition $K_N$ that are scheduled by the UL Grant gives the absolute total duration of the PUSCH transmission; that is $K_N \times L$ is the duration of the entire PUSCH transmission, and so if it collides with any invalid OFDM symbols, those parts are dropped. FIG. 10 shows two examples of PUSCH segmentation. At time $t_1$, a PUSCH with $K_N$=4, L=4 is transmitted, where the $3^{rd}$ nominal PUSCH repetition crosses the slot boundary at time $t_4$. Consequently, the $3^{rd}$ nominal PUSCH repetition is segmented into two PUSCH repetitions and therefore the actual number of repetitions $K_A$=5. At time $t_9$, another PUSCH with $K_N$=2, L=6, is transmitted, where the $1^{st}$ nominal PUSCH collides with 2 DL (or invalid) symbols between time $t_{10}$ and $t_{11}$. Consequently, the $1^{st}$ nominal PUSCH is segmented into two PUSCH repetitions, and therefore the actual number of repetitions $K_A$=3. Since $K_N \times L$=12 OFDM symbols is the total duration of the PUSCH transmission, the two PUSCH symbols that collide with the DL (or invalid) symbols between time $t_{10}$ and $t_{11}$ are therefore dropped.

UCI Multiplexing onto PUSCH Repetitions

Figure 11:
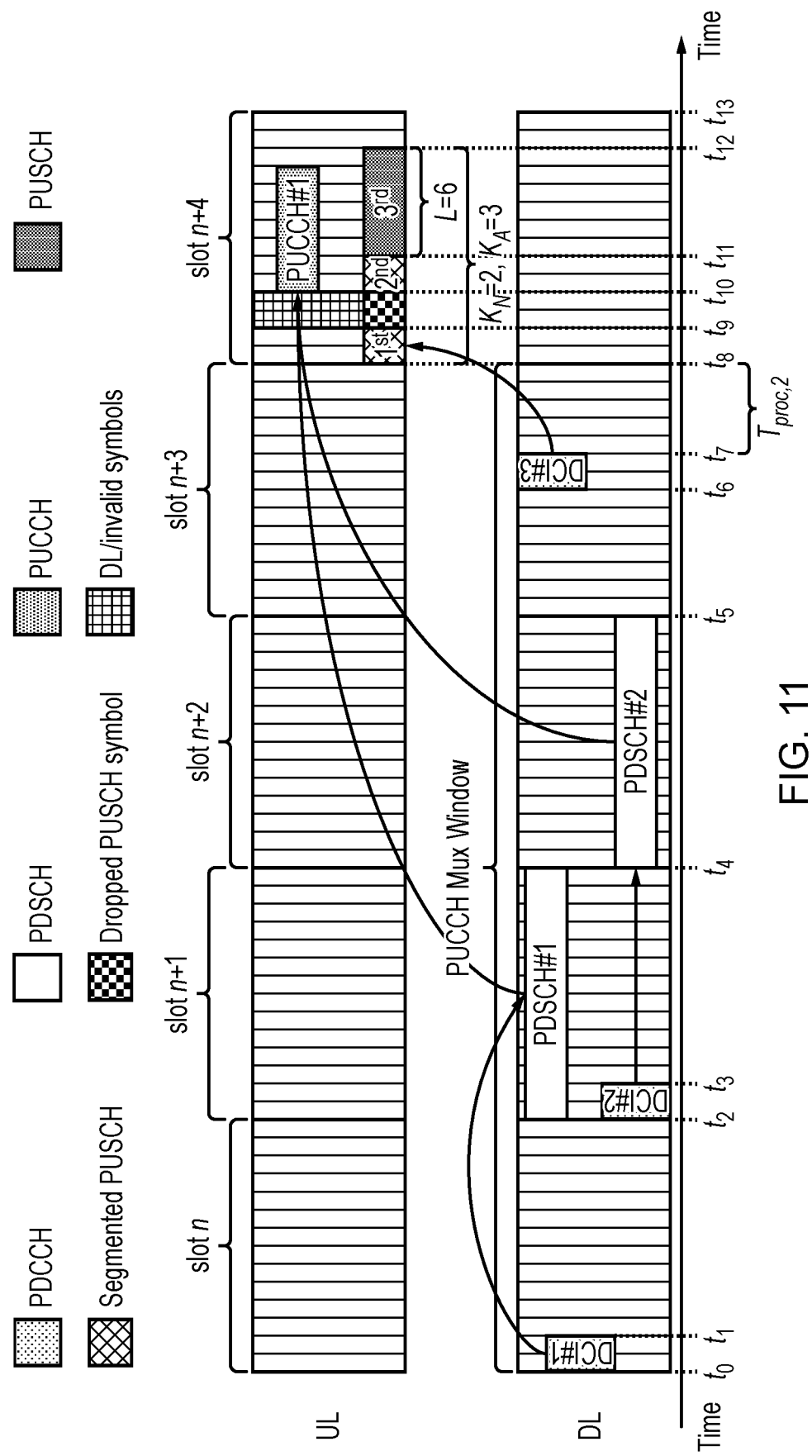
FIG. 11 shows an example of how a PUCCH may collide with multiple actual PUSCH repetitions.

In Rel-15, since PUSCH Aggregation is slot based repetition and a PUCCH cannot cross the slot boundary, then a PUCCH will collide with only one instance of the PUSCH Aggregation. It is therefore straightforward for the UCI to be multiplexed into the PUSCH repetition that it collides with when the timing criteria are met. However, in Rel-16, it is possible for a PUCCH to collide with multiple actual repetitions of a PUSCH transmission. An example is shown in FIG. 11, where DCI #1 and DCI #2 are DL Grants scheduling PDSCH #1 and PDSCH #2 respectively. The HARQ-ACK feedbacks for PDSCH #1 and PDSCH #2 are multiplexed in PUCCH #1. At time $t_6$, DCI #3 is transmitted which carries an UL Grant for a PUSCH with $K_N$=2 and L=6 to transmit at time $t_8$ to $t_{12}$. The $1^{st}$ nominal PUSCH repetition collides with invalid symbols between time $t_9$ and $t_{10}$ therefore it is segmented into two PUSCH segments giving a total actual repetitions $K_A$=3. Hence, PUCCH #1 collides with multiple actual PUSCH repetitions, i.e. $2^{nd}$ and $3^{rd}$ actual PUSCH repetitions in FIG. 11.

There are two issues identified on multiplexing the UCI in PUCCH onto the PUSCH:

Which actual PUSCH repetition is the UCI multiplexed into? and

How is the PUSCH resource determined for UCI multiplexing?

Figure 12:
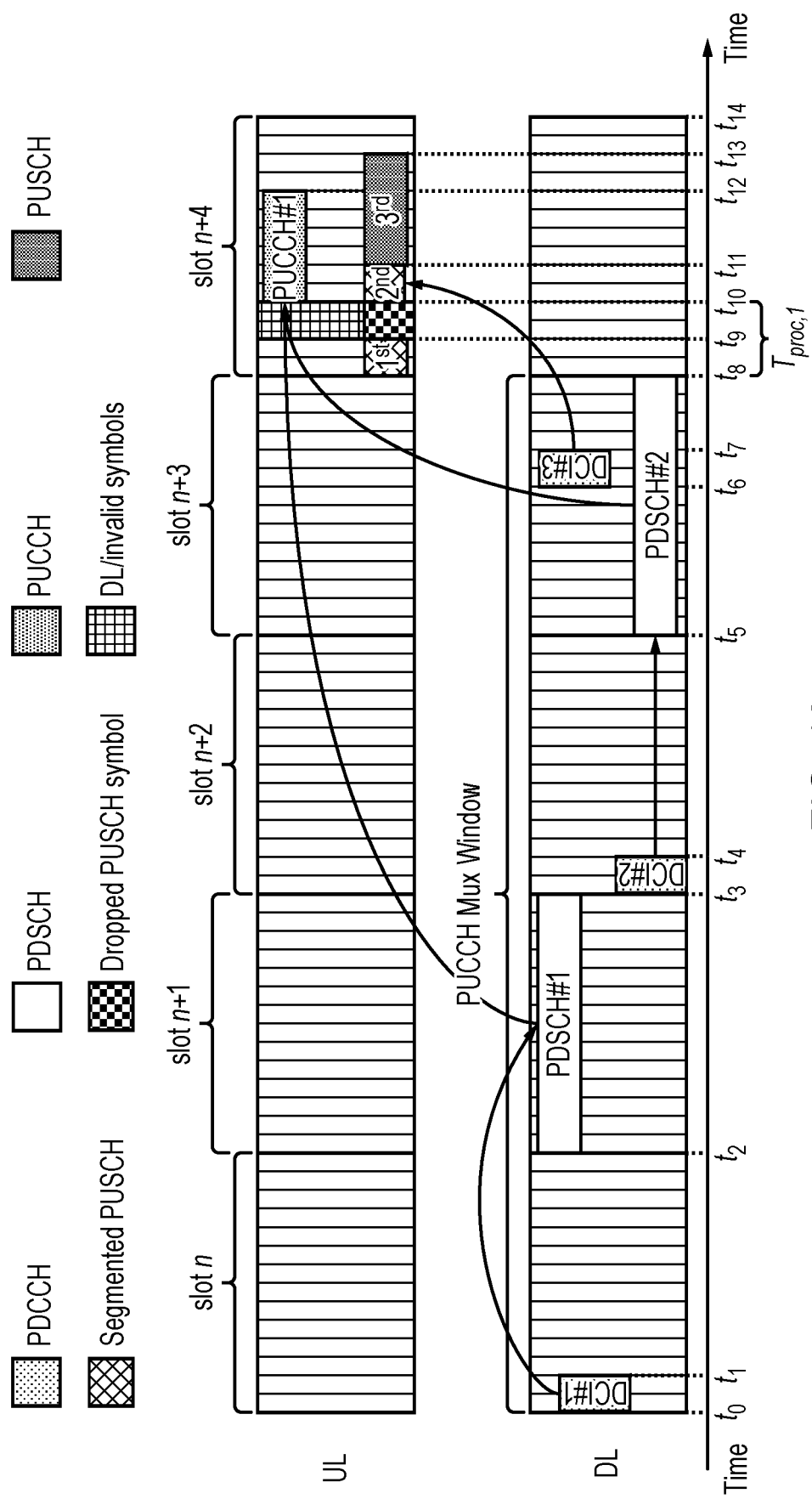
FIG. 12 shows an example of how a UCI may be multiplexed into an earliest actual PUSCH that meets the timing criteria.

For the first of the above issues, i.e. which actual PUSCH repetition to multiplex the UCI into, the following options were proposed in [5]:

Option 1: The UCI is multiplexed into the $1^{st}$ actual repetition for which it is assumed that the PUCCH and PUSCH meets the timeline criteria. For example, in FIG. 11 the colliding PUCCH and PUSCH meet the timeline criteria and therefore the UCI is multiplexed into the $1^{st}$ actual PUSCH repetition between time $t_8$ and $t_9$;

Option 2: The UCI is multiplexed into the earliest actual repetition that meets the timeline criteria. For example, in FIG. 12, DCI #1 and DCI #2 schedules PDSCH #1 and PDSCH #2 respectively, where their HARQ-ACK feedbacks are multiplexed into PUCCH #1 at time $t_{10}$ to $t_{12}$. DCI #3 schedules PUSCH with $K_N$=2 and L=6 to transmit between time $t_8$ and $t_{13}$. The $1^{st}$ nominal PUSCH repetition collides with 2 invalid symbols between time $t_9$ and $t_{10}$ and so it is segmented into two actual PUSCHs giving a total actual PUSCH repetitions $K_A$=3. PUCCH #1 collides with some of the actual PUSCH repetitions. In this example, the $1^{st}$ actual PUSCH does not meet the timeline criteria since it starts within $T_{proc,1}$ after PDSCH #2. In this option, the $2^{nd}$ actual PUSCH is the earliest PUSCH that meets the timeline criteria and so the UCI is multiplexed into the $2^{nd}$ actual PUSCH; and Option 3: The UCI is multiplexed into the overlapping actual PUSCH repetition that has the largest number of symbols (i.e. the longest duration). Using the example in FIG. 12, PUCCH #1 overlaps with the $2^{nd}$ and $3^{rd}$ actual PUSCH repetitions and since the 3$^{rd}$ actual PUSCH has longer duration, the UCI is multiplexed into the 3$^{rd}$ actual PUSCH.

The PUSCH resources for multiplexing UCI in Rel-15 is described in FIG. 7, and can be expressed using the following equation (see [6]) for HARQ-ACK bits:

$$Q'_{ACK} = \min\left\{\left\lceil\frac{(O_{ACK} + L_{ACK})\beta_{PUSCH}M_{PUSCH}}{TBS}\right\rceil, \lceil\alpha M_{PUSCH}\rceil\right\}$$

The variables $Q'_{ACK}$, $O_{ACK}$, $L_{ACK}$, $\beta_{PUSCH}$, $M_{PUSCH}$ and a are as described in FIG. 7. TBS is the transport block size of the colliding PUSCH, hence the first part of the equation:

$$\left\lceil\frac{(O_{ACK} + L_{ACK})\beta_{PUSCH}M_{PUSCH}}{TBS}\right\rceil$$

determines $Q_{ACK}$, i.e. the number of modulated symbols required for the UCI. The second part of the equation:

$$\lceil\alpha M_{PUSCH}\rceil$$

limits the number of Resource Elements (REs) that the UCI can use, which is determined by the factor $\alpha$.

The second of the above issues identified on multiplexing the UCI in PUCCH onto the PUSCH is how $Q_{ACK}$ and $Q'_{ACK}$ should be calculated. Three proposals are outlined in [5]:

Option A: $Q'_{ACK}$ is based on a nominal PUSCH repetition, i.e. $M_{PUSCH}$ and TBS are derived from a nominal PUSCH. Since an actual PUSCH repetition may have fewer REs than a nominal PUSCH, this option may lead to the UCI not having sufficient REs to multiplex into;

Option B: $Q'_{ACK}$ is based on actual PUSCH repetition, i.e. $M_{PUSCH}$ (the number of REs) and TBS should be based on the actual PUSCH that the UCI is multiplexed into. This will lead to UCI having too few REs since actual PUSCH may have fewer REs than nominal PUSCH, which has an impact on its reliability; and Option C: $Q_{ACK}$ is based on nominal PUSCH (i.e. first part of the equation) and the max limit of RE (i.e. 2$^{nd}$ part of the equation) is based on actual PUSCH, that is the equation becomes:

$$Q'_{ACK} = \min\left\{\left\lceil\frac{(O_{ACK} + L_{ACK})\beta_{PUSCH}M_{Nominal}}{TBS}\right\rceil, \lceil\alpha M_{Actual}\rceil\right\}$$

Where $M_{Nominal}$ is the number of REs in a nominal PUSCH and $M_{Actual}$ is the number of REs in an actual PUSCH, i.e. $M_{Nominal} \geq M_{Actual}$.

It has been recognised that these two issues of selecting which actual PUSCH repetition and determining the PUSCH resource for UCI multiplexing should not be treated independently, as they are related, and treating them independently is not efficient. If the selection of actual PUSCH repetition is independent from the determination of PUSCH resources, the selected PUSCH repetition may not provide sufficient PUSCH resources for UCI to be transmitted reliably as noted by some of the proposed options (Option A, Option B and Option C as described above) for determining the PUSCH resource for UCI. However, there are no solutions proposed by the prior art that take both of these issues into account. Embodiments of the present technique seek to provide solutions that do take both of these issues into account.

Enhanced UCI Multiplexing onto PUSCH Repetitions

Figure 13:
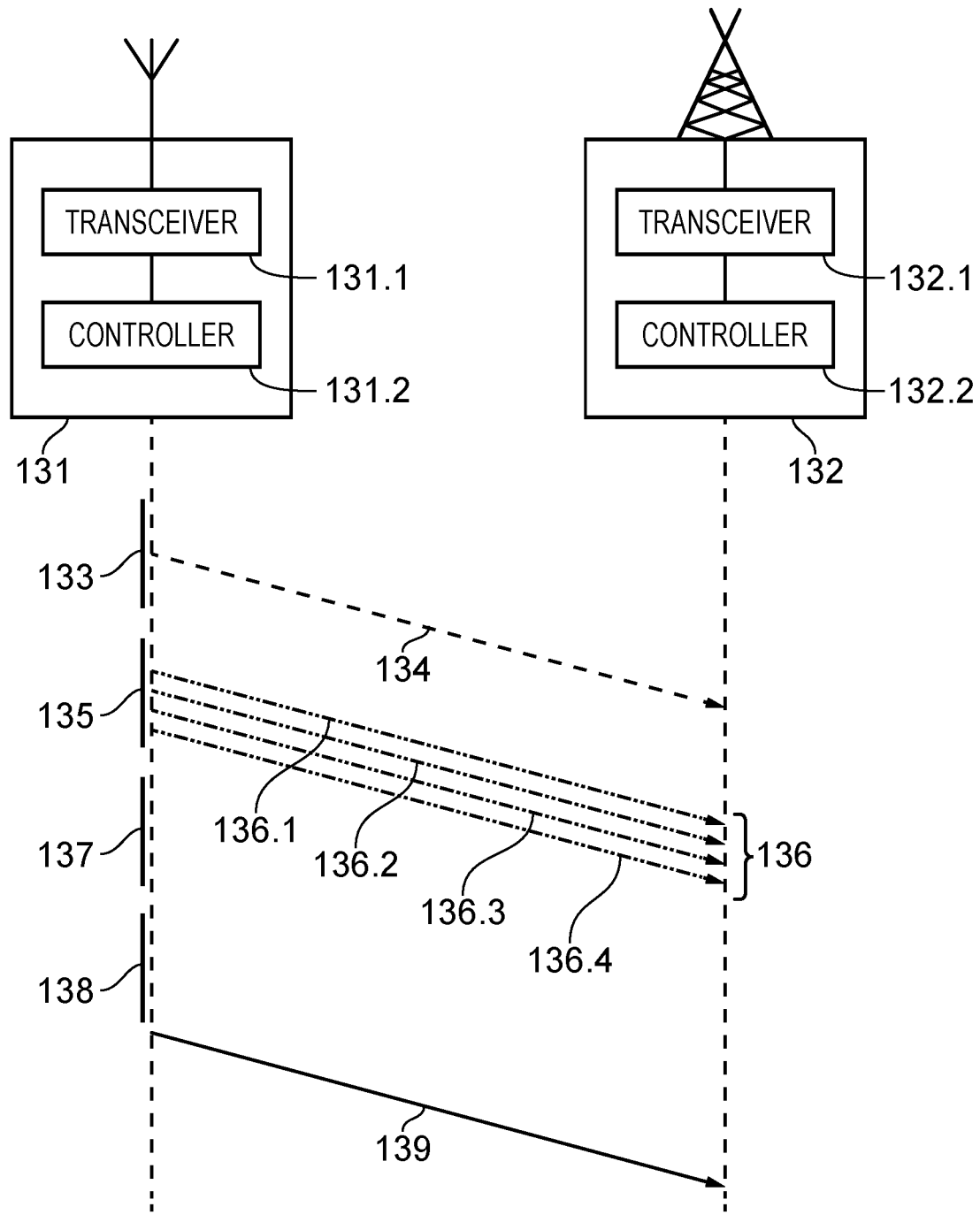
FIG. 13 shows a part schematic, part message flow diagram representation of a wireless communications network comprising a communications device and an infrastructure equipment in accordance with embodiments of the present technique.

FIG. 13 shows a part schematic, part message flow diagram representation of a wireless communications network comprising a communications device 131 and an infrastructure equipment 132 in accordance with at least some embodiments of the present technique. The communications device 131 is configured to transmit data to or receive data from the wireless communications network, for example, to and from the infrastructure equipment 132, via a wireless access interface provided by the wireless communications network. The communications device 131 and the infrastructure equipment 132 each comprise a transceiver (or transceiver circuitry) 131.1, 132.1, and a controller (or controller circuitry) 131.2, 132.2. Each of the controllers 131.2, 132.2 may be, for example, a microprocessor, a CPU, or a dedicated chipset, etc.

As shown in the example of FIG. 13, the transceiver circuitry 131.1 and the controller circuitry 131.2 of the communications device 131 are configured in combination, to determine 133 that the communications device 131 should transmit a first uplink signal 134 comprising control information to the wireless communications network (e.g. to the infrastructure equipment 132) in a set of uplink resources of a wireless access interface, to determine 135 that the communications device 131 should transmit a second uplink signal 136 to the wireless communications network (e.g. to the infrastructure equipment 132), wherein the second uplink signal 136 is to be transmitted a plurality of times 136.1, 136.2, 136.3, 136.4, each of the plurality of transmissions 136.1, 136.2, 136.3, 136.4 of the second uplink signal 136 being a repetition of the second uplink signal 136, wherein each repetition 136.1, 136.2, 136.3, 136.4 of the second uplink signal 136 is to be transmitted in a different set of uplink resources of the wireless access interface to the other repetitions 136.1, 136.2, 136.3, 136.4 of the second uplink signal 136, to determine 137 that the resources of the first uplink signal 134 at least partially overlap in time with the resources of at least one of the repetitions 136.1, 136.2, 136.3, 136.4 of the second uplink signal, to multiplex 138 the control information into the resources of a selected one or more of the repetitions 136.1, 136.2, 136.3, 136.4 of the second uplink signal 136, and to transmit 139 the multiplexed signal to the wireless communications network (e.g. to the infrastructure equipment 132). Here, a characteristic of the resources of the selected one or more repetitions 136.1, 136.2, 136.3, 136.4 of the second uplink signal 136 satisfies a predetermined condition.

It should be appreciated by those skilled in the art that typically, the second uplink signal will be an uplink data signal carried by PUSCH repetitions. However, in some cases, the PUSCH repetitions may not actually carry any data at all; for example, they may be carrying UCI such as CSI. Hence, while the second uplink signal may be understood as (and in at least some examples or arrangements of embodiments of the present technique described as) a data signal, the second uplink signal (and hence repetitions of it) may in some cases carry only control information.

Essentially, embodiments of the present technique propose that the actual PUSCH repetitions that have sufficient resource to carry the UCI are selected for the UCI to be multiplexed onto. Embodiments of the present technique recognise that selecting the PUSCH repetition without considering the resources that the selected PUSCH can offer may lead to insufficient resources for the UCI which may lead to the URLLC requirement for the UCI not being met. At least some embodiments of the present technique broadly require the execution of the following two steps:

1) Determine whether the available resources in each relevant actual PUSCH repetitions are sufficient (e.g. in terms of size, location, etc.); and
2) Select one or more actual PUSCH repetitions that have sufficient resource.

Determining Sufficient Resource

In determining whether an actual PUSCH repetition has sufficient resource for UCI multiplexing, the UE may need to calculate the available resource in an actual PUSCH repetition for UCI and compare it against a threshold, UCI threshold. That is, in at least some arrangements of embodiments of the present technique if the available resource in an actual PUSCH is equals to or greater than the UCI threshold, it is deemed as having sufficient resource. In other words, the characteristic is an amount of available resources, and the predetermined condition is that the amount of available resources is equal to or greater than an uplink control information threshold In calculating the available resource (e.g. REs) in an actual PUSCH for UCI, the system needs to determine the portion of resources in an actual PUSCH repetition that can be used for UCI. The following paragraphs describe arrangements of embodiments of the present technique which provide solutions to such a requirement.

In some arrangements, the said available resource is the minimum of the resource as determined by the a factor on the nominal PUSCH and all of the actual PUSCH resources. That is, $$Q_{Available} = \min\{\lceil \alpha M_{Nominal} \rceil, M_{Actual}\}$$

Where, $M_{Nominal}$ is the total REs available (i.e. not containing DMRS) in a nominal PUSCH repetition and $M_{Actual}$ is the total REs available in the actual PUSCH repetition. It should be noted that since the actual PUSCH repetition can have different sizes, $Q_{Available}$ is different for each actual PUSCH repetition. In other words, the amount of available resources is a minimum from among an amount of resources that the communications device is able to use for the control information and/or data information and a total amount of available resources (of the entire non-segmented PUSCH, e.g. including on both sides of a slot boundary if one is crossed by the PUSCH repetition, or the PUSCH comprises invalid symbols, etc.) determined by the communications device dependent on a scaling factor, the scaling factor being configured via RRC signalling from the wireless communications network. The scaling factor (i.e. a), as has been previously described above with respect to FIG. 7 for example, indicates a maximum number of resource elements that can be used for an uplink control information message (such as the first uplink signal) as a percentage of a number of resource elements of an uplink data channel which carries uplink data (i.e. the resources of the selected repetition(s) of the second uplink signal).

In some arrangements, all the resources in the actual PUSCH repetition can be used for UCI. That is the available resource, $Q_{Available} = M_{Actual}$. In other words, the amount of available resources is all of the resources that the communications device is able to use for the control information and/or data information. Those skilled in the art would appreciate that the resources in the PUSCH repetition, even if already partly allocated for uplink data, can be reallocated for UCI, for example by puncturing or rate matching. In these arrangements, where the available resource, $Q_{Available} = M_{Actual}$, all of the resources of the PUSCH can be reallocated for UCI.

In some arrangements, the resources in the actual PUSCH repetition that can be used for UCI is determined by a factor γ i.e. $Q_{Available} = \gamma M_{Actual}$. This factor γ can be RRC configured, indicated in the DCI or specified in the specifications. In other words, the amount of available resources is a factor of all of the resources that the communications device is able to use for the control information and/or data information.

In some implementations of these arrangements the factor γ=α; or

In some implementations of these arrangements the factor γ can be different for different actual PUSCH repetition. This allows the network to prevent some actual PUSCH repetitions from carrying UCI, e.g. by setting γ=0 or allow some to use all of its resource for UCI, i.e. γ=1. In other words, in these implementations, where each of the plurality of transmissions of the second uplink signal is a repetition of the second uplink signal in accordance with a logical repetition index associated with the second uplink signal, the factor is dependent on the repetition index of each repetition of the second uplink signal.

The UCI threshold $T_{UCI}$, is the minimum number of resources required to carry the UCI bits in a multiplexed PUSCH such that it meets the reliability requirement. In other words, the uplink control information threshold is a minimum amount of resources required to carry the control information such that a reliability requirement of the first uplink signal and/or the selected one or more repetitions of the second uplink signal is satisfied. Here, generally, a URLLC reliability requirement for one transmission of a packet is $1-10^{-5}$ for 32 bytes with a user plane latency of 1 ms, as has been described above with respect to [2].

In some arrangements the UCI threshold is determined by the $\beta_{PUSCH}$ factor and the resources in a nominal PUSCH repetition $M_{Nominal}$. In other words, the uplink control information threshold is determined by the communications device dependent on the amount of available resources, a number of bits required to carry the control information, and an offset indicator indicating a value (which may be a value of one of a plurality of sets each comprising a plurality of values) for multiplication with the number of bits required to carry the control information and with the amount of available resources. The thresholds for HARQ-ACK UCI bits $T_{ACK}$, CSI Part 1 bits $T_{CSI-1}$ and CSI Part 2 bits $T_{CSI-2}$ are defined as follows:

$$T_{ACK} = \left\lceil \frac{(O_{ACK} + L_{ACK})\beta_{PUSCH} M_{Nominal}}{TBS} \right\rceil$$

$$T_{CSI-1} = \left\lceil \frac{(O_{CSI-1} + L_{CSI-1})\beta_{PUSCH} M_{Nominal}}{TBS} \right\rceil$$

$$T_{CSI-2} = \left\lceil \frac{(O_{CSI-2} + L_{CSI-2})\beta_{PUSCH} M_{Nominal}}{TBS} \right\rceil$$

where
TBS is the transport block size of the nominal PUSCH repetition;
$O_{ACK}$ and $L_{ACK}$ are as described in FIG. 7;
$O_{CSI-1}$ & $O_{CSI-2}$ are the number of bits in CSI Part 1 and CSI Part 2 respectively as described in [6]; and
$L_{CS-1}$ & $L_{CSI-2}$ are the CRC bits for CSI Part 1 and CSI Part 2 respectively as described in [6].

This recognises that the $\beta_{PUSCH}$ factor is used to ensure a required reliability for the UCI bits and so REs (or modulated symbols) required should be based on $\beta_{PUSCH}$ factor. These arrangements of embodiments of the present technique can be implemented in at least the following ways:

$T_{UCI} = T_{ACK}$: This implementation prioritises the HARQ-ACK bits ensuring that the actual PUSCH has sufficient bits to carry the HARQ-ACK bits;

$T_{UCI} = T_{ACK} + T_{CSI-1}$: This implementation prioritises HARQ-ACK bits and CSI Part 1 bits;

$T_{UCI} = T_{ACK} + T_{CSI-1} + T_{CSI-2}$: This implementation ensures that all the UCI bits HARQ-ACK, CSI Part 1 and CSI Part 2 can be transmitted in the actual PUSCH; and $T_{UCI} = T_{ACK} + T_{CSI-2}$: This implementation prioritises HARQ-ACK bits and CSI Part 2 bits.

In some arrangements there may be multiple UCI thresholds, $T_{UCI-1}$, $T_{UCI-2}$, $T_{UCI-3}$, etc. These arrangements may be used if more than one actual PUSCH repetition are used to carry UCI. In other words, the uplink control information threshold is one of a plurality of uplink control information thresholds, wherein the number of the plurality of uplink control information thresholds is dependent on the number of the selected one or more repetitions of the second uplink signal.

With respect the selection of the actual PUSCH repetition, arrangements of embodiments of the present technique may broadly fall into one of the two following categories:

Single actual PUSCH repetition selection

Multiple actual PUSCH repetitions selection

In at least some arrangements of embodiments of the present technique, the actual PUSCH repetitions being considered are those that meet the timeline criteria as described above. In other words, the characteristic is a temporal (i.e. in time) position of the resources, and the predetermined condition is that a start of the temporal position of the resources is later than a threshold time period after a most recently received downlink signal associated with one of the first uplink signal or the second uplink signal. Here, the threshold time period may define an amount of time required for the communications device to process the most recently received downlink signal.

The UE may then (or may otherwise) consider the remaining actual PUSCH repetitions that meet the timeline criteria as per the arrangements of embodiments of the present techniques described in both the "Single Actual PUSCH Repetition Selection" and "Multiple Actual PUSCH Repetition Selection" sections below.

Single Actual PUSCH Repetition Selection

In the following arrangements of embodiments of the present technique, only a single actual PUSCH repetition is selected for multiplexing of UCI bits. In other words, the selected one or more of the repetitions of the second uplink signal is a selected one of the repetitions of the second uplink signal.

In some arrangements, the actual PUSCH repetitions where the available resource is equal or larger than the UCI threshold are considered for UCI multiplexing, i.e. $Q_{Available} \geq T_{UCI}$. In other words, the selected repetition of the second uplink signal is one of a subset of the repetitions of the second uplink signal for which the resources comprise an amount of available resources equal to or greater than an uplink control information threshold. Here, as described with respect to at least some arrangements of embodiments of the present technique above, the uplink control information threshold may be a minimum amount of resources required to carry the control information such that a reliability requirement (as has been described above with respect to [2] of the first uplink signal and/or the selected one or more repetitions of the second uplink signal is satisfied.

Figure 14:
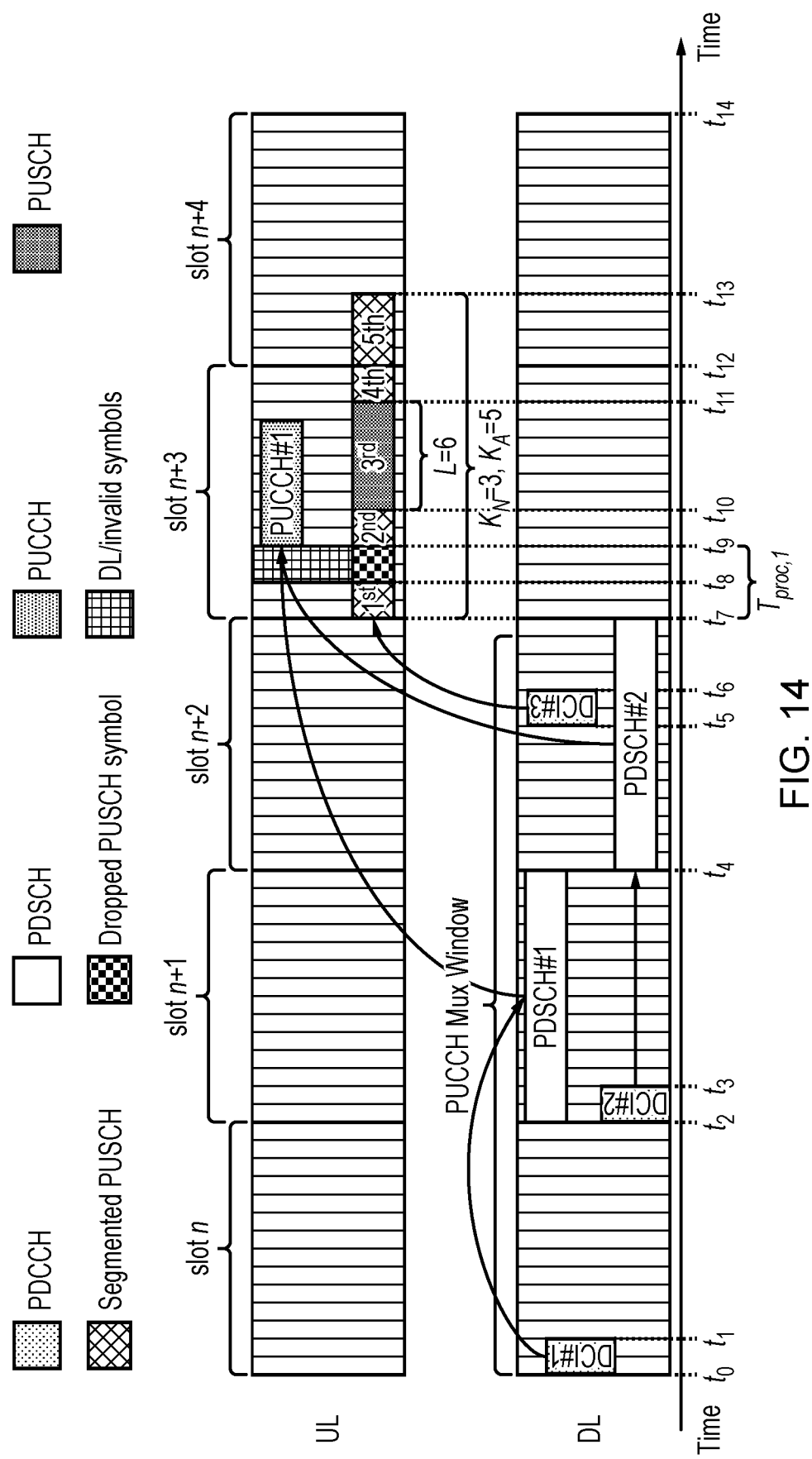
FIG. 14 illustrates an example of how the earliest actual PUSCH with $Q_{Available} > T_{UCI}$ may be selected for UCI to be multiplexed onto in accordance with embodiments of the present technique.

In some arrangements, the earliest actual PUSCH among those considered for UCI multiplexing is selected. In other words, the selected repetition of the second uplink signal is the one of the subset of the repetitions of the second uplink signal for which the resources are located earliest in time. An example is shown in FIG. 14, where DCI #1 and DCI #2 schedule PDSCH #1 and PDSCH #2 respectively with their corresponding HARQ-ACK feedbacks multiplexed into PUCCH #1. At time $t_5$, DCI #3 carrying an UL Grant schedules a PUSCH with $K_N=3$ & L=6 between time $t_7$ & $t_{13}$, where it collides with invalid symbols between time $t_8$ & $t_9$ and crosses slot boundary at time $t_{12}$. The PUSCH is therefore segmented giving number of actual repetitions $K_A=5$. Hence, PUCCH #1 collides with the scheduled PUSCH. The $1^{st}$ actual PUSCH repetition starts before $T_{proc,1}$ ends and therefore does not meet the timeline criteria and is not considered further for UCI multiplexing. Assume that $T_{UCI}$ requires an actual PUSCH with at least 3 symbols, then only the $3^{rd}$ and $5^{th}$ actual PUSCH repetitions meets sufficient available condition, i.e. $Q_{Available} \geq T_{UCI}$. In these arrangements, the earliest actual PUSCH that meets all the conditions are selected and hence the $3^{rd}$ actual PUSCH repetition is selected for UCI multiplexing.

Figure 15:
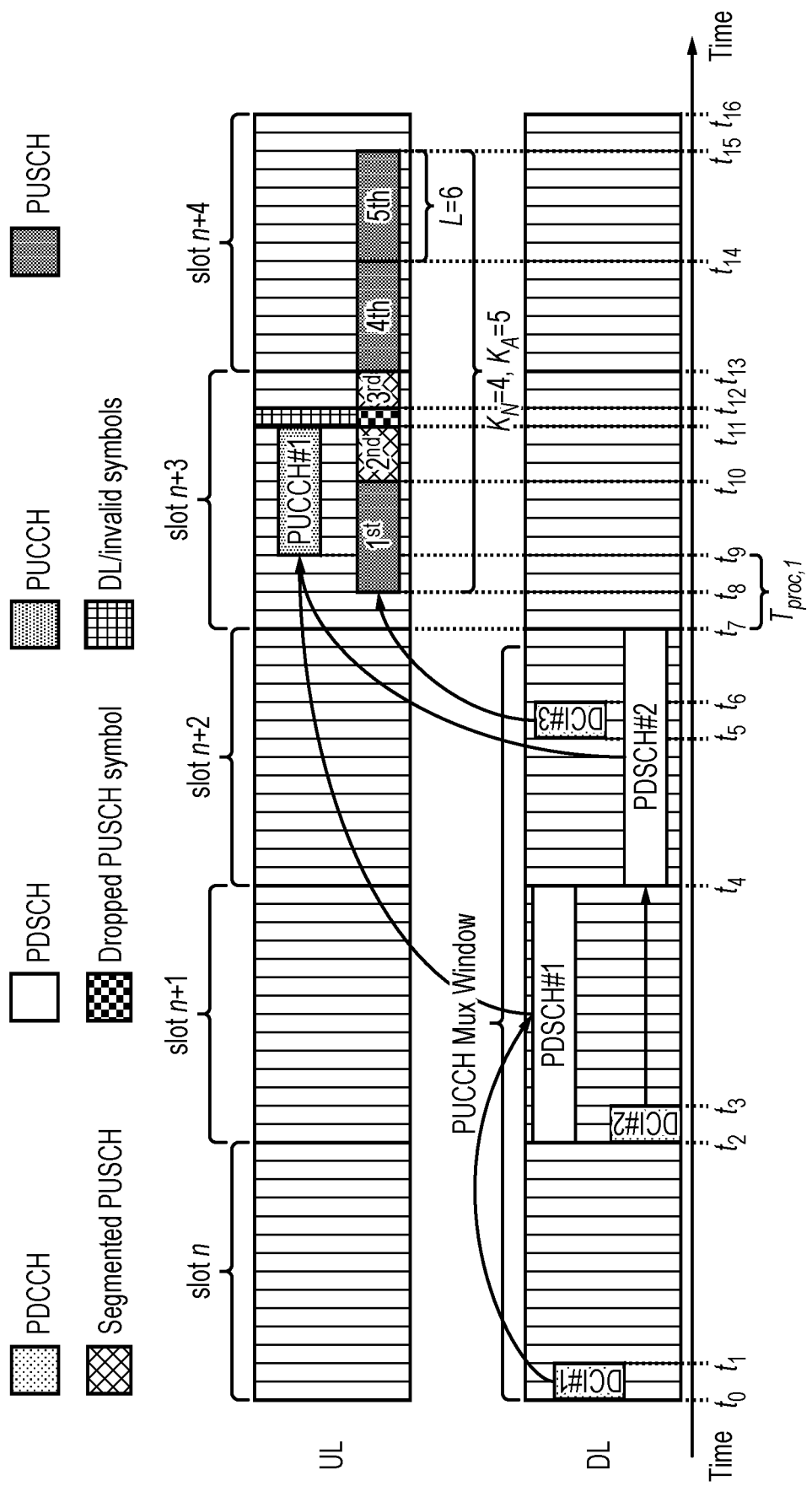
FIG. 15 illustrates an example of how the largest actual PUSCH may be selected for UCI to be multiplexed onto in accordance with embodiments of the present technique.

In some arrangements, the actual PUSCH with the largest available resource is selected among those considered for UCI multiplexing. In other words, the selected repetition of the second uplink signal is the one of the subset of the repetitions of the second uplink signal having a largest amount of available resources. An example is shown in FIG. 15, where PUCCH #1 carries HARQ-ACK for PDSCH #1 and PDSCH #2. At time $t_5$, DCI #3 carrying an UL Grant schedules a PUSCH with $K_N=4$ & L=6 between time $t_8$ and $t_{15}$, where the $2^{nd}$ nominal PUSCH collides with an invalid symbol between time $t_{ii}$ & $t_{12}$ thereby segmenting the PUSCH giving an actual number of repetitions $K_A=5$. The $1^{st}$ actual PUSCH between time $t_8$ and $t_{10}$ starts before finishes and therefore it does not meet the timeline criteria and is not considered for UCI multiplexing. Assume that UCI threshold, $T_{UCI}$ requires an actual PUSCH with at least 3 OFDM symbols and so $2^{nd}$, $4^{th}$ and $5^{th}$ actual PUSCH repetitions meets the $Q_{Available} \geq T_{UCI}$ condition. As per these arrangements the actual PUSCH with the largest resource is selected and here the $4^{th}$ and $5^{th}$ actual repetitions have the same number of resources. In this example the previously described arrangements of selecting the earliest actual PUSCH among those considered for UCI multiplexing and of selecting the earlier actual PUSCH are combined; i.e. the $4^{th}$ actual PUSCH is selected for UCI multiplexing. That is, if more than one of the repetitions of the second uplink signal has a joint-largest amount of available resources, then the one of these joint-largest resources that is located earliest in time is selected for UCI multiplexing.

In Rel-16, two physical layer priority levels were introduced to handle intra-UE collisions, where a low priority transmission is dropped if it collides with a high priority transmission, e.g. URLLC transmission overriding an eMBB transmission. Hence, UCI multiplexing into PUSCH repetition occurs when the UCI and the PUSCH have the same priority, and for URLLC transmission latency is important. The following arrangements of embodiments of the present technique take latency into consideration.

In some arrangements, the actual PUSCH repetitions that overlap within a UCI time window $W_{UCI}$, are considered for UCI multiplexing. This ensures the UCI is transmitted within a given latency which can be managed by this said UCI time window. In other words, the selected repetition of the second uplink signal is one of a subset of the repetitions of the second uplink signal for which the resources at least partially overlap in time with an uplink control information time window.

Figure 16:
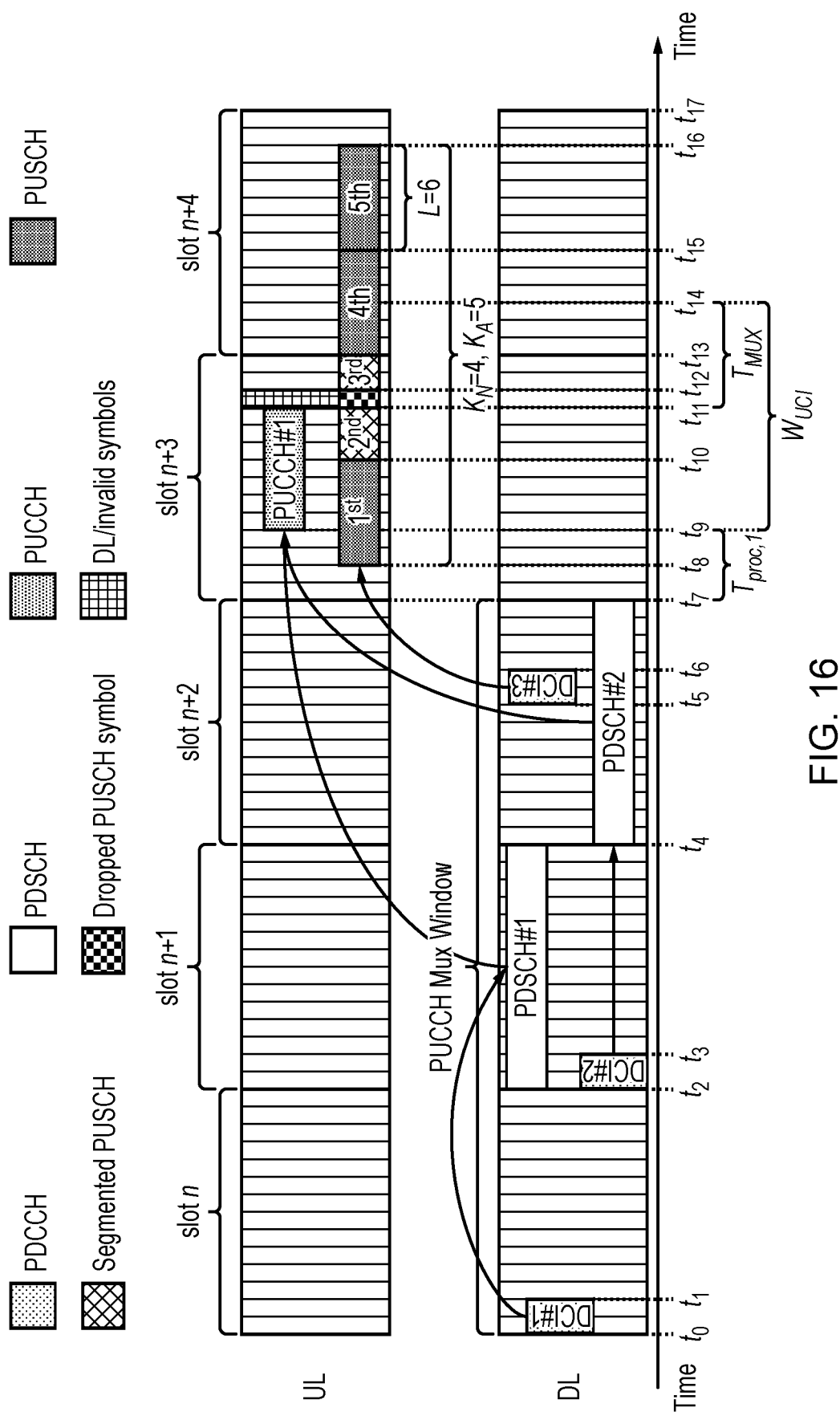
FIG. 16 illustrates a first example of how PUSCH(s) may be selected for UCI to be multiplexed onto with respect to a UCI time window ($W_{UCI}$) in accordance with embodiments of the present technique.

In some arrangements, the said UCI time window $W_{UCI}$, starts from the start of the PUCCH and ends $T_{MUX}$ after the end of the PUCCH. In other words, the uplink control information time window defines a time duration starting at the same time as the resources of the first uplink signal and ending after a predetermined timer (which may be, for example, defined by the wireless communications network or defined in the specifications, etc.) (i.e. $T_{MUX}$) has ended. An example is shown in FIG. 16, where PUCCH #1 is scheduled between time $t_9$ to $t_{11}$ carrying HARQ-ACK feedbacks for PDSCH #1 and PDSCH #2. At time $t_5$, DCI #3 carrying an UL Grant schedules a PUSCH with $K_N$=4 & L=6 which is segmented to give an actual repetition $K_A$=5. PUCCH #1 collides with the PUSCH repetitions and hence its UCI is multiplexed into the PUSCH. The $1^{st}$ actual PUSCH does not meet the timeline criteria since it starts prior to the end of $T_{proc,1}$ and is not considered for UCI multiplexing. As per these arrangement, the UCI time window $W_{UCI}$ starts from the start of PUCCH #1 at time $t_9$ and ends at time $t_{14}$ which is $T_{MUX}$ after the end of PUCCH #1. Here, $2^{nd}$, $3^{rd}$ and $4^{th}$ actual PUSCH repetitions overlap with $W_{UCI}$ and so they are considered for UCI multiplexing. Using the largest PUSCH resource method as per the above described arrangements of embodiments of the present technique, the UE selects the $4^{th}$ actual PUSCH repetition for UCI multiplexing.

In some arrangements, $T_{MUX}$=0, that is only actual PUSCH repetitions that overlaps with PUCCH are considered for UCI multiplexing. In other words, the selected repetition of the second uplink signal is one of a subset of the repetitions of the second uplink signal for which the resources at least partially overlap with the resources of the first uplink signal.

In some arrangements, only actual PUSCH repetitions that are fully contained in the UCI time window $W_{UCI}$ are considered for UCI multiplexing. In other words, the resources of the subset of the repetitions of the second uplink signal fully overlap in time with the uplink control information time window. Using the example in FIG. 16, only the $2^{nd}$ and $3^{rd}$ actual PUSCH repetitions are fully contained in $W_{UCI}$ and so they are considered for UCI multiplexing.

In some arrangements, when none of the actual PUSCH repetitions have sufficient resources, i.e. none of the actual PUSCH repetitions meet any of the above-described conditions, the UE selects the earliest actual PUSCH repetitions. In other words, if the characteristic of the resources of none of the repetitions of the second uplink signal satisfies the predetermined condition, the selected one or more of the repetitions of the second uplink signal is the one of the repetitions of the second uplink signal for which the resources are located earliest in time.

In some arrangements, when none of the actual PUSCH repetitions have sufficient resources, i.e. none of the actual PUSCH repetitions meet any of the above-described conditions, the UE selects the PUSCH with the largest resource and if more than one PUSCH having the largest resource (e.g. the $4^{th}$ and $5^{th}$ actual PUSCH repetitions in FIG. 16) then the earliest among those with the largest resource is selected. In other words, if the characteristic of the resources of none of the repetitions of the second uplink signal satisfies the predetermined condition, the selected one or more of the repetitions of the second uplink signal the one of the repetitions of the second uplink signal having a largest amount of available resources. Again, if more than one of the repetitions of the second uplink signal has a joint-largest amount of available resources, then the one of these joint-largest resources that is located earliest in time is selected for UCI multiplexing.

In some arrangements, when none of the actual PUSCH repetitions have sufficient resources, the UE considers multiplexing the UCI in multiple actual PUSCH repetitions. In other words, the selected one or more of the repetitions of the second uplink signal is a selected plurality of the repetitions of the second uplink signal.

Multiple Actual PUSCH Repetition Selection

In the following arrangements of embodiments of the present technique, the UCI is multiplexed into multiple actual PUSCH repetitions. This can be done if UE fails to find a single actual PUSCH repetition that meets the resource requirement or it can be done regardless if any single actual PUSCH repetition meets the resource requirement. Here, the communications device may determine that the selected one or more of the repetitions of the second uplink signal is the selected plurality of the repetitions of the second uplink signal if the characteristic of the resources of none of the selected plurality of repetitions of the second uplink signal individually satisfies the predetermined condition The actual PUSCH repetitions that meets the resource condition, i.e. $Q_{Available} \geq T_{UCI}$ and the time criteria as described above are termed as qualified actual PUSCH repetitions. In other words, the characteristic is a temporal position of the resources, and the predetermined condition is that a start of the temporal position of the resources is later than a threshold time period after a most recently received downlink signal associated with one of the first uplink signal or the second uplink signal, wherein the resources of each of a subset comprising two or more of the repetitions of the second uplink signal comprise an amount of available resources equal to or greater than an uplink control information threshold, the two or more of the repetitions of the second uplink signal each being a qualified repetition of the second uplink signal, and wherein the selected plurality of the repetitions of the second uplink signal are each qualified repetitions of the second uplink signal.

In some arrangements, all qualified actual PUSCH repetitions are used for UCI multiplexing. In other words, at least a part of the control information is multiplexed into each of the plurality of qualified repetitions of the second uplink signal.

In some arrangements, all qualified actual PUSCH repetitions that also overlaps/contained within the UCI time window $W_{UCI}$ (which, as described above, may define a time duration starting at the same time as the resources of the first uplink signal and ending after a predetermined timer (which may be, for example, defined by the wireless communications network or defined in the specifications, etc.) (i.e. $T_{MUX}$) has ended) are used for UCI multiplexing. In other words, at least a part of the control information is multiplexed into each of the plurality of qualified repetitions of the second uplink signal for which the resources at least partially overlap in time with an uplink control information time window.

In some arrangements, N actual PUSCH are used for UCI multiplexing. In other words, at least a part of the control information is multiplexed into a specified number of the plurality of qualified repetitions of the second uplink signal. The value N can be RRC configured, indicated in the DCI or specified in the specifications.

In some arrangements, the first N qualified actual PUSCH repetitions are used for UCI multiplexing. In other words, the specified number of the plurality of qualified repetitions of the second uplink signal are those for which the resources are located earliest in time.

In some arrangements, the largest N qualified actual PUSCH repetitions are used for UCI multiplexing. In other words, the specified number of the plurality of qualified repetitions of the second uplink signal are those for which the resources have a largest amount of available resources.

In some arrangements, these N qualified actual PUSCH as per previously described arrangements overlap or contained within the UCI time window $W_{UCI}$. In other words, the specified number of the plurality of qualified repetitions of the second uplink signal are those for which the resources at least partially overlap in time with an uplink control information time window (which, as described above, may define a time duration starting at the same time as the resources of the first uplink signal and ending after a predetermined timer (which may be, for example, defined by the wireless communications network or defined in the specifications, etc.) (i.e. $T_{MUX}$) has ended).

In some arrangements, the UCI is repeated in the selected multiple actual PUSCH repetitions. In other words, the control information is fully multiplexed into each of the selected plurality of the repetitions of the second uplink signal. These arrangements improve the reliability of the UCI, though of course at some efficiency cost. These arrangements also recognises that a large $\beta_{PUSCH}$ factor demands a lot of resource from an actual PUSCH repetition and so it allows a smaller $\beta_{PUSCH}$ factor to be used but compensate the loss in reliability via repetition over multiple actual PUSCH repetitions.

In some arrangements, the UCI is split into multiple actual PUSCH repetitions. In other words, a different portion of the control information is multiplexed into each of the selected plurality of the repetitions of the second uplink signal. Here, multiple UCI thresholds may be used. These arrangements are beneficial but not limited to cases where a single actual PUSCH does not have sufficient resource to contain the entire UCI bits.

In some arrangements, the UCI is split such that HARQ-ACK bits are in one actual PUSCH repetition and the CSI bits are in other actual PUSCH repetition(s). Of course, where a UCI doesn't comprise HARQ-ACK bits (or even if it does), the CSI Part 1 bits and CSI Part 2 bits can be in different actual PUSCH repetitions. In other words, the different portions of the control information comprise different types of uplink control information. Here, at least a first portion of the control information may comprise feedback information whether or not a downlink signal was received successfully by the communications device, and wherein at least a second portion of the control information may comprise Channel State Information, CSI, which indicates one or more communications characteristics of an uplink data message transmitted by the communications device. Here, different thresholds are used for different parts of the UCI bits. That is for the HARQ-ACK bits the UCI threshold=$T_{ACK}$, that is actual PUSCHs that satisfy $Q_{Available} \geq T_{ACK}$, are considered for multiplexing. Similarly, for multiplexing CSI Part 1 and CSI Part 2, actual PUSCHs that satisfy $Q_{Available} \geq T_{CSI-1}$ and $Q_{Available} \geq T_{CSI-2}$ respectively are considered for their multiplexing the respective CSI parts. If both CSI Part 1 and CSI Part 2 are multiplexed into the same actual PUSCH repetition, then the resource condition is $Q_{Available} \geq T_{CSI-1} + T_{CSI-2}$. That is the resource conditions for a qualified actual PUSCH repetitions are:

For multiplexing of HARQ-ACK bits, the qualified actual PUSCH has available resource $Q_{Available} \geq T_{ACK}$.

For multiplexing of CSI Part 1, the qualified actual PUSCH has available resource $Q_{Available} \geq T_{CSI-1}$.

For multiplexing of CSI Part 2 bits, the qualified actual PUSCH has available resource $Q_{Available} \geq T_{CSI-2}$.

For multiplexing of CSI Part 1 & Part 2 bits, the qualified actual PUSCH has available resource $Q_{Available} \geq T_{CSI-1} + T_{CSI-2}$.

In some arrangements, the CSI Part 1 and CSI Part 2 bits are multiplexed into separate qualified actual PUSCH repetitions if none of the actual PUSCH repetitions are qualified to multiplex both CSI Parts, i.e. none of them meets to resource condition $Q_{Available} \geq T_{CSI-1} + T_{CSI-2}$. In other words, at least a part of the control information is multiplexed into each of the plurality of qualified repetitions of the second uplink signal if the resources of none of the plurality of qualified repetitions of the second uplink signal comprise an amount of available resources large enough for the entire control information.

In some arrangements where the HARQ-ACK bits and CSI bits are multiplexed into separate actual PUSCH repetitions, the HARQ-ACK bits are multiplexed into the earliest qualified actual PUSCH repetition where $Q_{Available} \geq T_{ACK}$. In other words, the at least the first portion of the control information is multiplexed into one or more of the selected plurality of the repetitions of the second uplink signal for which the resources are located earliest in time. Here, the CSI may be periodic, or may be transmitted in response to a command from the network, and the uplink data message for which the CSI is transmitted may be the second uplink signal 136 as shown in FIG. 13, or may be any other uplink data message. The CSI bits are then multiplexed into the earliest remaining qualified actual PUSCH repetition(s), where $Q_{Available} \geq T_{CSI-1} + T_{CSI-2}$. If CSI Part 1 and CSI Part 2 are multiplexed in separate actual PUSCH repetitions then CSI Part 1 bits are considered first followed by CSI Part 2 bits. In other words, the resources of one or more of the selected plurality of the repetitions of the second uplink signal into which the at least the second portion of the control information is multiplexed are those located earliest in time from among the resources of the remaining plurality of qualified repetitions of the second uplink signal into which the at least the first portion of the control information is not multiplexed.

Figure 17:
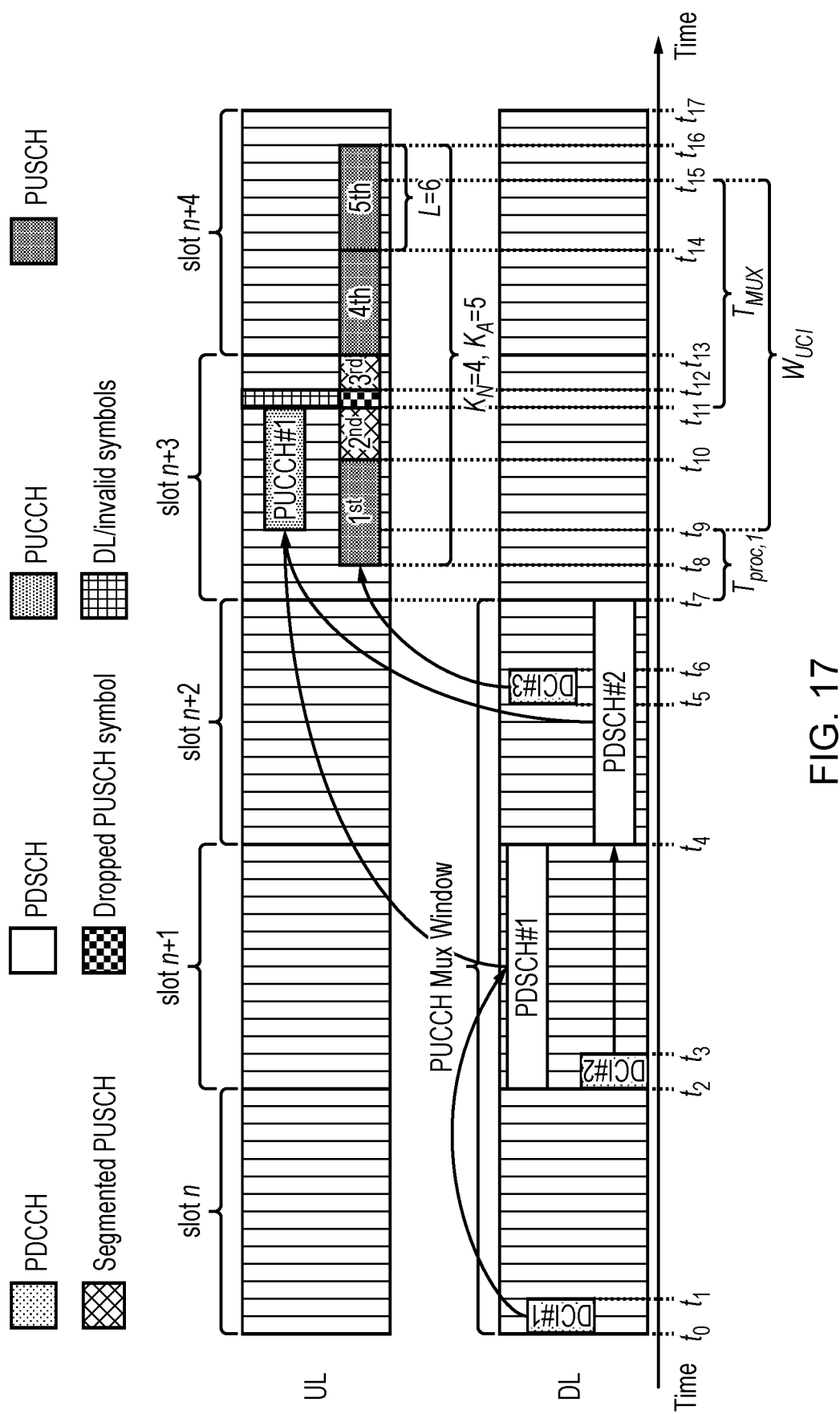
FIG. 17 a second example of how PUSCH(s) may be selected for UCI to be multiplexed onto with respect to a UCI time window ($W_{UCI}$), where UCI bits may be split across different qualified actual PUSCH repetitions in accordance with embodiments of the present technique.

An example is shown in FIG. 17, which is similar to FIG. 16, but with the UCI time window $W_{UCI}$ extended (between time $t_9$ to $t_{15}$) to include the 5$^{th}$ actual PUSCH repetition. Here, the qualified actual PUSCH repetitions for HARQ-ACK are the 2$^{nd}$, 4$^{th}$ and 5$^{th}$ actual PUSCH repetitions. Since the 2$^{nd}$ PUSCH is the earliest qualified PUSCH, the HARQ-ACK bits are multiplexed into the 2$^{nd}$ PUSCH. The CSI bits are then multiplexed into the first remaining qualified actual PUSCH which in this case is the 4$^{th}$ actual PUSCH.

In some arrangements, the HARQ-ACK bits are multiplexed into the largest qualified actual PUSCH repetition. The CSI bits are then multiplexed into the largest remaining qualified actual PUSCH repetition. Using the example in FIG. 17, the qualified actual PUSCH repetitions for HARQ-ACK bits are the 2$^{nd}$, 4$^{th}$ and 5$^{th}$ actual PUSCH repetitions. The HARQ-ACK bits are multiplexed into the 4$^{th}$ actual PUSCH since it is the largest PUSCH and in this case also the earlier PUSCH among those with the largest resource. The CSI bits are then multiplexed into the 5$^{th}$ actual PUSCH which is the remaining actual PUSCH that has the largest resource. In other words, the at least the first portion of the control information is multiplexed into one or more of the selected plurality of the repetitions of the second uplink signal for which the resources have a largest amount of available resources. Then, the resources of one or more of the selected plurality of the repetitions of the second uplink signal into which the at least the second portion of the control information is multiplexed are those having a largest amount of available resources from among the resources of the remaining plurality of qualified repetitions of the second uplink signal into which the at least the first portion of the control information is not multiplexed.

In some arrangements, the HARQ-ACK bits are multiplexed into the largest qualified actual PUSCH whilst the CSI bits are multiplexed into the earliest remaining qualified actual PUSCH. In other words, the at least the first portion of the control information is multiplexed into one or more of the selected plurality of the repetitions of the second uplink signal for which the resources have a largest amount of available resources. Then, the resources of one or more of the selected plurality of the repetitions of the second uplink signal into which the at least the second portion of the control information is multiplexed are those located earliest in time from among the resources of the remaining plurality of qualified repetitions of the second uplink signal into which the at least the first portion of the control information is not multiplexed.

In some arrangements, the HARQ-ACK bits are multiplexed into the earliest qualified actual PUSCH whilst the CSI bits are multiplexed into the largest remaining qualified actual PUSCH. In other words, the at least the first portion of the control information is multiplexed into one or more of the selected plurality of the repetitions of the second uplink signal for which the resources are located earliest in time. Then, the resources of one or more of the selected plurality of the repetitions of the second uplink signal into which the at least the second portion of the control information is multiplexed are those having a largest amount of available resources from among the resources of the remaining plurality of qualified repetitions of the second uplink signal into which the at least the first portion of the control information is not multiplexed.

It should be noted that the UCI may contain HARQ-ACK bits but no CSI bits and vice-versa. It should also be noted that UCI can be carried by PUSCH, e.g. CSI bits and so the collision can be PUSCH carrying CSI with a PUSCH carrying data.

Flow Chart Representation

Figure 18:
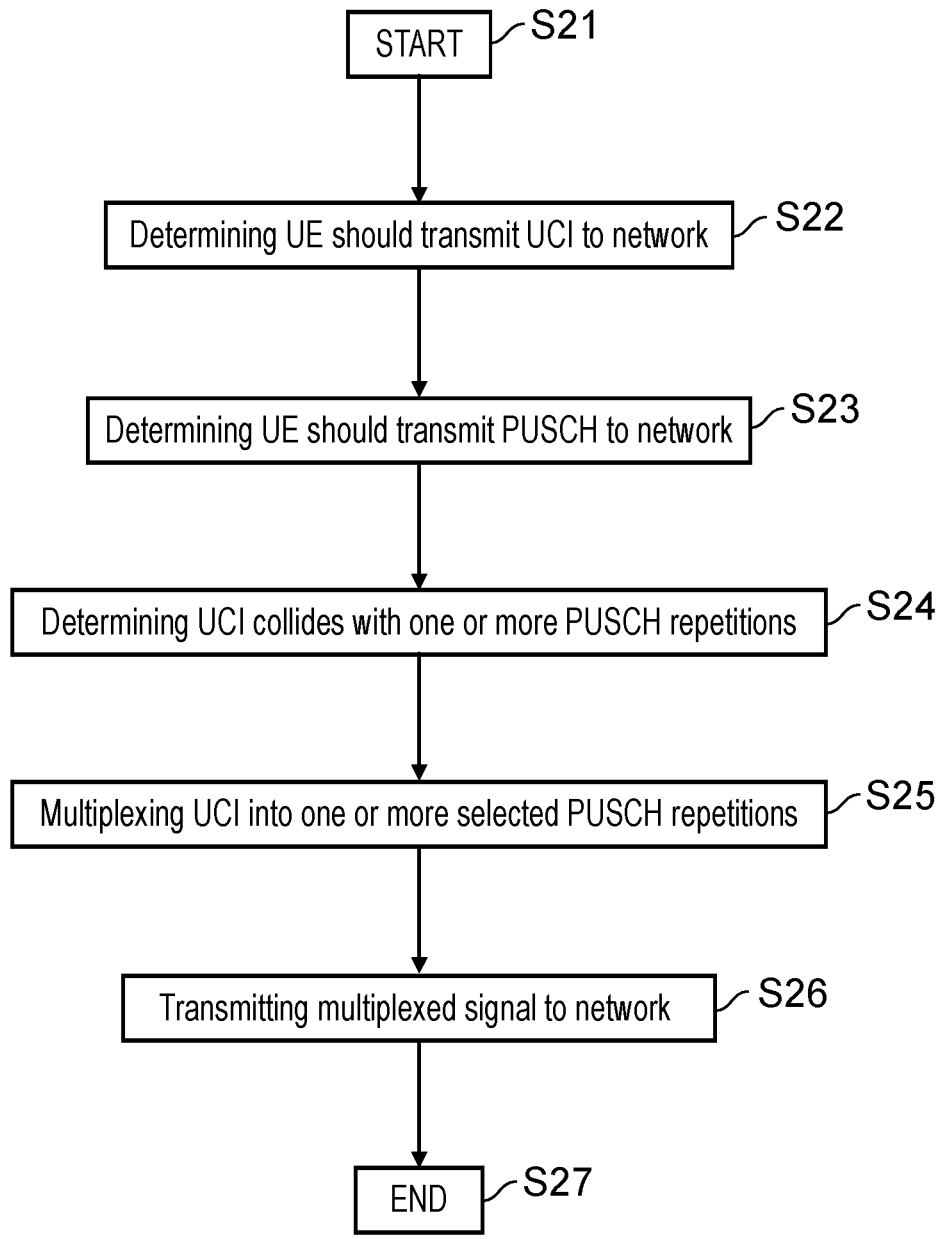
FIG. 18 shows a flow diagram illustrating a process of communications in a communications system in accordance with embodiments of the present technique.

FIG. 18 shows a flow diagram illustrating a first example process of communications in a communications system in accordance with embodiments of the present technique. The process shown by FIG. 18 is a method of operating a communications device (which may be configured to transmit data to or receive data from an infrastructure equipment) in a wireless communications network.

The method begins in step S21. The method comprises, in step S22, determining that the communications device should transmit a first uplink signal comprising control information to the wireless communications network in a set of uplink resources of a wireless access interface. The process then moves to step S23, which involves determining that the communications device should transmit a second uplink signal to the wireless communications network, wherein the second uplink signal is to be transmitted a plurality of times, each of the plurality of transmissions of the second uplink signal being a repetition of the second uplink signal, wherein each repetition of the second uplink signal is to be transmitted in a different set of uplink resources of the wireless access interface to the other repetitions of the second uplink signal. Next, in step S24, the method comprises determining that the resources of the first uplink signal at least partially overlap in time with the resources of at least one of the repetitions of the second uplink signal. The process then comprises, in step S25, multiplexing the control information into the resources of a selected one or more of the repetitions of the second uplink signal, and then in step S26, transmitting the multiplexed signal to the wireless communications network. Here, a characteristic of the resources of the selected one or more repetitions of the second uplink signal satisfies a predetermined condition. The method ends in step S27.

Those skilled in the art would appreciate that the method shown by FIG. 18 may be adapted in accordance with embodiments of the present technique. For example, other intermediate steps may be included in the method, or the steps may be performed in any logical order.

Though embodiments of the present technique have been described largely by way of the example communications system shown in FIG. 13, and further with respect to FIGS. 14 to 17, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device in a wireless communications network, the method comprising determining that the communications device should transmit a first uplink signal comprising control information to the wireless communications network in a set of uplink resources of a wireless access interface, determining that the communications device should transmit a second uplink signal to the wireless communications network, wherein the second uplink signal is to be transmitted a plurality of times, each of the plurality of transmissions of the second uplink signal being a repetition of the second uplink signal, wherein each repetition of the second uplink signal is to be transmitted in a different set of uplink resources of the wireless access interface to the other repetitions of the second uplink signal, determining that the resources of the first uplink signal at least partially overlap in time with the resources of at least one of the repetitions of the second uplink signal, multiplexing the control information into the resources of a selected one or more of the repetitions of the second uplink signal, and transmitting the multiplexed signal to the wireless communications network, wherein a characteristic of the resources of the selected one or more repetitions of the second uplink signal satisfies a predetermined condition.

Paragraph 2. A method according to Paragraph 1, wherein the characteristic is an amount of available resources, and the predetermined condition is that the amount of available resources is equal to or greater than an uplink control information threshold.

Paragraph 3. A method according to Paragraph 2, wherein the amount of available resources is a minimum from among an amount of resources that the communications device is able to use for the control information and/or data information and a total amount of available resources determined by the communications device dependent on a scaling factor, the scaling factor being configured via RRC signalling from the wireless communications network.

Paragraph 4. A method according to Paragraph 2 or Paragraph 3, wherein the amount of available resources is all of the resources that the communications device is able to use for the control information and/or data information.

Paragraph 5. A method according to any of Paragraphs 2 to 4, wherein the amount of available resources is a factor of all of the resources that the communications device is able to use for the control information and/or data information.

Paragraph 6. A method according to Paragraph 5, wherein each of the plurality of transmissions of the second uplink signal is a repetition of the second uplink signal in accordance with a logical repetition index associated with the second uplink signal, and wherein the factor is dependent on the repetition index of each repetition of the second uplink signal.

Paragraph 7. A method according to any of Paragraphs 2 to 6, wherein the uplink control information threshold is a minimum amount of resources required to carry the control information such that a reliability requirement of the first uplink signal and/or the selected one or more repetitions of the second uplink signal is satisfied.

Paragraph 8. A method according to any of Paragraphs 2 to 7, wherein the uplink control information threshold is determined by the communications device dependent on the amount of available resources, a number of bits required to carry the control information, and an offset indicator indicating a value for multiplication with the number of bits required to carry the control information and with the amount of available resources.

Paragraph 9. A method according to any of Paragraphs 2 to 8, wherein the uplink control information threshold is one of a plurality of uplink control information thresholds, wherein the number of the plurality of uplink control information thresholds is dependent on the number of the selected one or more repetitions of the second uplink signal.

Paragraph 10. A method according to any of Paragraphs 1 to 9, wherein the characteristic is a temporal position of the resources, and the predetermined condition is that a start of the temporal position of the resources is later than a threshold time period after a most recently received downlink signal associated with one of the first uplink signal or the second uplink signal.

Paragraph 11. A method according to Paragraph 10, wherein the threshold time period defines an amount of time required for the communications device to process the most recently received downlink signal.

Paragraph 12. A method according to any of Paragraphs 1 to 11, wherein the selected one or more of the repetitions of the second uplink signal is a selected one of the repetitions of the second uplink signal.

Paragraph 13. A method according to Paragraph 12, wherein the selected repetition of the second uplink signal is one of a subset of the repetitions of the second uplink signal for which the resources comprise an amount of available resources equal to or greater than an uplink control information threshold.

Paragraph 14. A method according to Paragraph 13, wherein the selected repetition of the second uplink signal is the one of the subset of the repetitions of the second uplink signal for which the resources are located earliest in time.

Paragraph 15. A method according to Paragraph 13 or Paragraph 14, wherein the selected repetition of the second uplink signal is the one of the subset of the repetitions of the second uplink signal having a largest amount of available resources.

Paragraph 16. A method according to any of Paragraphs 12 to 15, wherein the selected repetition of the second uplink signal is one of a subset of the repetitions of the second uplink signal for which the resources at least partially overlap in time with an uplink control information time window.

Paragraph 17. A method according to Paragraph 16, wherein the uplink control information time window defines a time duration starting at the same time as the resources of the first uplink signal and ending after a predetermined timer has ended.

Paragraph 18. A method according to Paragraph 16 or Paragraph 17, wherein the resources of the subset of the repetitions of the second uplink signal fully overlap in time with the uplink control information time window.

Paragraph 19. A method according to any of Paragraphs 12 to 18, wherein the selected repetition of the second uplink signal is one of a subset of the repetitions of the second uplink signal for which the resources at least partially overlap with the resources of the first uplink signal.

Paragraph 20. A method according to any of Paragraphs 1 to 19, wherein if the characteristic of the resources of none of the repetitions of the second uplink signal satisfies the predetermined condition, the selected one or more of the repetitions of the second uplink signal is the one of the repetitions of the second uplink signal for which the resources are located earliest in time.

Paragraph 21. A method according to any of Paragraphs 1 to 20, wherein if the characteristic of the resources of none of the repetitions of the second uplink signal satisfies the predetermined condition, the selected one or more of the repetitions of the second uplink signal is the one of the repetitions of the second uplink signal having a largest amount of available resources.

Paragraph 22. A method according to any of Paragraphs 1 to 21, wherein the selected one or more of the repetitions of the second uplink signal is a selected plurality of the repetitions of the second uplink signal.

Paragraph 23. A method according to Paragraph 22, wherein the communications device determines that the selected one or more of the repetitions of the second uplink signal is the selected plurality of the repetitions of the second uplink signal if the characteristic of the resources of none of the selected plurality of repetitions of the second uplink signal individually satisfies the predetermined condition.

Paragraph 24. A method according to Paragraph 22 or Paragraph 23, wherein the characteristic is a temporal position of the resources, and the predetermined condition is that a start of the temporal position of the resources is later than a threshold time period after a most recently received downlink signal associated with one of the first uplink signal or the second uplink signal, wherein the resources of each of a subset comprising two or more of the repetitions of the second uplink signal comprise an amount of available resources equal to or greater than an uplink control information threshold, the two or more of the repetitions of the second uplink signal each being a qualified repetition of the second uplink signal, and wherein the selected plurality of the repetitions of the second uplink signal are each qualified repetitions of the second uplink signal.

Paragraph 25. A method according to Paragraph 24, wherein at least a part of the control information is multiplexed into each of the plurality of qualified repetitions of the second uplink signal.

Paragraph 26. A method according to Paragraph 25, wherein at least a part of the control information is multiplexed into each of the plurality of qualified repetitions of the second uplink signal if the resources of none of the plurality of qualified repetitions of the second uplink signal comprise an amount of available resources large enough for the entire control information.

Paragraph 27. A method according to any of Paragraphs 24 to 26, wherein at least a part of the control information is multiplexed into each of the plurality of qualified repetitions of the second uplink signal for which the resources at least partially overlap in time with an uplink control information time window.

Paragraph 28. A method according to any of Paragraphs 24 to 27, wherein at least a part of the control information is multiplexed into a specified number of the plurality of qualified repetitions of the second uplink signal.

Paragraph 29. A method according to Paragraph 28, wherein the specified number of the plurality of qualified repetitions of the second uplink signal are those for which the resources are located earliest in time.

Paragraph 30. A method according to Paragraph 28 or Paragraph 29, wherein the specified number of the plurality of qualified repetitions of the second uplink signal are those for which the resources have a largest amount of available resources.

Paragraph 31. A method according to any of Paragraphs 28 to 30, wherein the specified number of the plurality of qualified repetitions of the second uplink signal are those for which the resources at least partially overlap in time with an uplink control information time window.

Paragraph 32. A method according to any of Paragraphs 24 to 31, wherein the control information is fully multiplexed into each of the selected plurality of the repetitions of the second uplink signal.

Paragraph 33. A method according to any of Paragraphs 24 to 32, wherein a different portion of the control information is multiplexed into each of the selected plurality of the repetitions of the second uplink signal.

Paragraph 34. A method according to Paragraph 33, wherein the different portions of the control information comprise different types of uplink control information.

Paragraph 35. A method according to Paragraph 34, wherein at least a first portion of the control information comprises feedback information whether or not a downlink signal was received successfully by the communications device, and wherein at least a second portion of the control information comprises Channel State Information, CSI, which indicates one or more communications characteristics of an uplink data message transmitted by the communications device.

Paragraph 36. A method according to Paragraph 35, wherein the at least the first portion of the control information is multiplexed into one or more of the selected plurality of the repetitions of the second uplink signal for which the resources are located earliest in time.

Paragraph 37. A method according to Paragraph 36, wherein the resources of one or more of the selected plurality of the repetitions of the second uplink signal into which the at least the second portion of the control information is multiplexed are those located earliest in time from among the resources of the remaining plurality of qualified repetitions of the second uplink signal into which the at least the first portion of the control information is not multiplexed.

Paragraph 38. A method according to Paragraph 36 or Paragraph 37, wherein the resources of one or more of the selected plurality of the repetitions of the second uplink signal into which the at least the second portion of the control information is multiplexed are those having a largest amount of available resources from among the resources of the remaining plurality of qualified repetitions of the second uplink signal into which the at least the first portion of the control information is not multiplexed.

Paragraph 39. A method according to any of Paragraphs 35 to 38, wherein the at least the first portion of the control information is multiplexed into one or more of the selected plurality of the repetitions of the second uplink signal for which the resources have a largest amount of available resources.

Paragraph 40. A method according to Paragraph 39, wherein the resources of one or more of the selected plurality of the repetitions of the second uplink signal into which the at least the second portion of the control information is multiplexed are those having a largest amount of available resources from among the resources of the remaining plurality of qualified repetitions of the second uplink signal into which the at least the first portion of the control information is not multiplexed Paragraph 41. A method according to Paragraph 39 or Paragraph 40, wherein the resources of one or more of the selected plurality of the repetitions of the second uplink signal into which the at least the second portion of the control information is multiplexed are those located earliest in time from among the resources of the remaining plurality of qualified repetitions of the second uplink signal into which the at least the first portion of the control information is not multiplexed.

Paragraph 42. A communications device suitable for use in a wireless communications network, the communications device comprising
    transceiver circuitry configured to transmit signals and receive signals via a wireless access interface, and
    controller circuitry configured in combination with the transceiver circuitry
    to determine that the communications device should transmit a first uplink signal comprising control information to the wireless communications network in a set of uplink resources of the wireless access interface,
    to determine that the communications device should transmit a second uplink signal to the wireless communications network, wherein the second uplink signal is to be transmitted a plurality of times, each of the plurality of transmissions of the second uplink signal being a repetition of the second uplink signal, wherein each repetition of the second uplink signal is to be transmitted in a different set of uplink resources of the wireless access interface to the other repetitions of the second uplink signal,
    to determine that the resources of the first uplink signal at least partially overlap in time with the resources of at least one of the repetitions of the second uplink signal,
    to multiplex the control information into the resources of a selected one or more of the repetitions of the second uplink signal, and
    to transmit the multiplexed signal to the wireless communications network, wherein a characteristic of the resources of the selected one or more repetitions of the second uplink signal satisfies a predetermined condition.

Paragraph 43. Circuitry for a communications device suitable for use in a wireless communications network, the circuitry comprising
- transceiver circuitry configured to transmit signals and receive signals via a wireless access interface, and
- controller circuitry configured in combination with the transceiver circuitry
- to determine that the transceiver circuitry should transmit a first uplink signal comprising control information to the wireless communications network in a set of uplink resources of the wireless access interface,
- to determine that the transceiver circuitry should transmit a second uplink signal to the wireless communications network, wherein the second uplink signal is to be transmitted a plurality of times, each of the plurality of transmissions of the second uplink signal being a repetition of the second uplink signal, wherein each repetition of the second uplink signal is to be transmitted in a different set of uplink resources of the wireless access interface to the other repetitions of the second uplink signal,
- to determine that the resources of the first uplink signal at least partially overlap in time with the resources of at least one of the repetitions of the second uplink signal,
- to multiplex the control information into the resources of a selected one or more of the repetitions of the second uplink signal, and
- to transmit the multiplexed signal to the wireless communications network,
- wherein a characteristic of the resources of the selected one or more repetitions of the second uplink signal satisfies a predetermined condition.

Paragraph 44. A method of operating an infrastructure equipment forming part of a wireless communications network, the method comprising
- allocating a set of uplink resources of a wireless access interface provided by the infrastructure equipment in which a communications device is to transmit a first uplink signal comprising control information to the wireless communications network,
- allocating a plurality of sets of uplink resources of the wireless access interface in which the communications device is to transmit a second uplink signal to the wireless communications network, wherein the second uplink signal is to be transmitted a plurality of times, each of the plurality of transmissions of the second uplink signal being a repetition of the second uplink signal, wherein each repetition of the second uplink signal is to be transmitted in a different one of the plurality of sets of uplink resources of the wireless access interface to the other repetitions of the second uplink signal,
- determining that the resources of the first uplink signal at least partially overlap in time with the resources of at least one of the repetitions of the second uplink signal,
- receiving one or more of the plurality of repetitions of the second uplink signal from the communications device, and
- extracting the control information from a selected one or more of the received repetitions of the second uplink signal, the control information having been multiplexed by the communications device into the resources of the selected one or more of the repetitions of the second uplink signal,
- wherein a characteristic of the resources of the selected one or more repetitions of the second uplink signal satisfies a predetermined condition.

Paragraph 45. An infrastructure equipment forming part of a wireless communications network, the infrastructure equipment comprising
- transceiver circuitry configured to transmit signals and receive signals via a wireless access interface provided by the infrastructure equipment, and
- controller circuitry configured in combination with the transceiver circuitry
- to allocate a set of uplink resources of the wireless access interface in which a communications device is to transmit a first uplink signal comprising control information to the wireless communications network,
- to allocate a plurality of sets of uplink resources of the wireless access interface in which the communications device is to transmit a second uplink signal to the wireless communications network, wherein the second uplink signal is to be transmitted a plurality of times, each of the plurality of transmissions of the second uplink signal being a repetition of the second uplink signal, wherein each repetition of the second uplink signal is to be transmitted in a different one of the plurality of sets of uplink resources of the wireless access interface to the other repetitions of the second uplink signal,
- to determine that the resources of the first uplink signal at least partially overlap in time with the resources of at least one of the repetitions of the second uplink signal,
- to receive one or more of the plurality of repetitions of the second uplink signal from the communications device, and
- to extract the control information from a selected one or more of the received repetitions of the second uplink signal, the control information having been multiplexed by the communications device into the resources of the selected one or more of the repetitions of the second uplink signal,
- wherein a characteristic of the resources of the selected one or more repetitions of the second uplink signal satisfies a predetermined condition.

Paragraph 46. Circuitry for an infrastructure equipment forming part of a wireless communications network, the circuitry comprising
- transceiver circuitry configured to transmit signals and receive signals via a wireless access interface provided by the infrastructure equipment, and
- controller circuitry configured in combination with the transceiver circuitry
- to allocate a set of uplink resources of the wireless access interface in which a communications device is to transmit a first uplink signal comprising control information to the wireless communications network,
- to allocate a plurality of sets of uplink resources of the wireless access interface in which the communications device is to transmit a second uplink signal to the wireless communications network, wherein the second uplink signal is to be transmitted a plurality of times, each of the plurality of transmissions of the second uplink signal being a repetition of the second uplink signal, wherein each repetition of the second uplink signal is to be transmitted in a different one of the plurality of sets of uplink resources of the wireless access interface to the other repetitions of the second uplink signal, to determine that the resources of the first uplink signal at least partially overlap in time with the resources of at least one of the repetitions of the second uplink signal, to receive one or more of the plurality of repetitions of the second uplink signal from the communications device, and to extract the control information from a selected one or more of the received repetitions of the second uplink signal, the control information having been multiplexed by the communications device into the resources of the selected one or more of the repetitions of the second uplink signal, wherein a characteristic of the resources of the selected one or more repetitions of the second uplink signal satisfies a predetermined condition.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software miming on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] TR 38.913, "Study on Scenarios and Requirements for Next Generation Access Technologies (Release 14)", $3^{rd}$ Generation Partnership Project, v14.3.0.
[3] RP-190726, "Physical layer enhancements for NR ultra-reliable and low latency communication (URLLC)", Huawei, HiSilicon, RAN #83.
[4] TS 38.213, "NR; Physical layer procedures for control (Release 15)", $3^{rd}$ Generation Partnership Project, v15.8.0.
[5] R1-2001401, "Summary of email discussion [100e-NR-L1enh_URLLC-PUSCH_Enh-01] (AI 7.2.5.3)," Nokia, Nokia Shanghai Bell, RAN1 #100-e.
[6] TS38.212, "NR: Multiplexing and channel coding (Release 16)" v16.0.0.

What is claimed is:

1. A method of operating a communications device in a wireless communications network, the method comprising:
determining that the communications device should transmit a first uplink signal comprising control information to the wireless communications network in a set of uplink resources of a wireless access interface, determining that the communications device should transmit a second uplink signal to the wireless communications network, wherein the second uplink signal is to be transmitted a plurality of times, each of the plurality of transmissions of the second uplink signal being a repetition of the second uplink signal, wherein each repetition of the second uplink signal is to be transmitted in a different set of uplink resources of the wireless access interface to the other repetitions of the second uplink signal, determining that the resources of the first uplink signal at least partially overlap in time with the resources of at least one of the repetitions of the second uplink signal, multiplexing the control information into the resources of a selected one or more of the repetitions of the second uplink signal, and transmitting the multiplexed signal to the wireless communications network, wherein a characteristic of the resources of the selected one or more repetitions of the second uplink signal, which includes at least a size thereof, satisfies a predetermined condition.

2. A method according to claim 1, wherein the characteristic includes an amount of available resources, and the predetermined condition is that the amount of available resources is equal to or greater than an uplink control information threshold.

3. A method according to claim 2, wherein the amount of available resources is a minimum from among an amount of resources that the communications device is able to use for the control information and/or data information and a total amount of available resources determined by the communications device dependent on a scaling factor, the scaling factor being configured via RRC signalling from the wireless communications network.

4. A method according to claim 2, wherein the amount of available resources is all of the resources that the communications device is able to use for the control information and/or data information.

5. A method according to claim 2, wherein the amount of available resources is a factor of all of the resources that the communications device is able to use for the control information and/or data information.

6. A method according to claim 5, wherein each of the plurality of transmissions of the second uplink signal is a repetition of the second uplink signal in accordance with a logical repetition index associated with the second uplink signal, and wherein the factor is dependent on the repetition index of each repetition of the second uplink signal.

7. A method according to claim 2, wherein the uplink control information threshold is a minimum amount of resources required to carry the control information such that a reliability requirement of the first uplink signal and/or the selected one or more repetitions of the second uplink signal is satisfied.

8. A method according to claim 2, wherein the uplink control information threshold is determined by the communications device dependent on the amount of available resources, a number of bits required to carry the control information, and an offset indicator indicating a value for multiplication with the number of bits required to carry the control information and with the amount of available resources.

9. A method according to claim 2, wherein the uplink control information threshold is one of a plurality of uplink control information thresholds, wherein the number of the plurality of uplink control information thresholds is dependent on the number of the selected one or more repetitions of the second uplink signal.

10. A method according to claim 1, wherein the characteristic is a temporal position of the resources, and the predetermined condition is that a start of the temporal position of the resources is later than a threshold time period after a most recently received downlink signal associated with one of the first uplink signal or the second uplink signal.

11. A method according to claim 10, wherein the threshold time period defines an amount of time required for the communications device to process the most recently received downlink signal.

12. A method according to claim 1, wherein the selected one or more of the repetitions of the second uplink signal is a selected one of the repetitions of the second uplink signal.

13. A method according to claim 12, wherein the selected repetition of the second uplink signal is one of a subset of the repetitions of the second uplink signal for which the resources comprise an amount of available resources equal to or greater than an uplink control information threshold.

14. A method according to claim 13, wherein the selected repetition of the second uplink signal is the one of the subset of the repetitions of the second uplink signal for which the resources are located earliest in time.

15. A method according to claim 13, wherein the selected repetition of the second uplink signal is the one of the subset of the repetitions of the second uplink signal having a largest amount of available resources.

16. A method according to claim 12, wherein the selected repetition of the second uplink signal is one of a subset of the repetitions of the second uplink signal for which the resources at least partially overlap in time with an uplink control information time window.

17. A method according to claim 16, wherein the uplink control information time window defines a time duration starting at the same time as the resources of the first uplink signal and ending after a predetermined timer has ended.

18. A method according to claim 16, wherein the resources of the subset of the repetitions of the second uplink signal fully overlap in time with the uplink control information time window.

19. A communications device suitable for use in a wireless communications network, the communications device comprising:
    transceiver circuitry configured to transmit signals and receive signals via a wireless access interface, and
    controller circuitry configured in combination with the transceiver circuitry
        to determine that the communications device should transmit a first uplink signal comprising control information to the wireless communications network in a set of uplink resources of the wireless access interface,
        to determine that the communications device should transmit a second uplink signal to the wireless communications network, wherein the second uplink signal is to be transmitted a plurality of times, each of the plurality of transmissions of the second uplink signal being a repetition of the second uplink signal,
        wherein each repetition of the second uplink signal is to be transmitted in a different set of uplink resources of the wireless access interface to the other repetitions of the second uplink signal,
        to determine that the resources of the first uplink signal at least partially overlap in time with the resources of at least one of the repetitions of the second uplink signal,
        to multiplex the control information into the resources of a selected one or more of the repetitions of the second uplink signal, and
        to transmit the multiplexed signal to the wireless communications network,
    wherein a characteristic of the resources of the selected one or more repetitions of the second uplink signal, including at least a size thereof, satisfies a predetermined condition.

20. An infrastructure equipment forming part of a wireless communications network, the infrastructure equipment comprising:
    transceiver circuitry configured to transmit signals and receive signals via a wireless access interface provided by the infrastructure equipment, and
    controller circuitry configured in combination with the transceiver circuitry
        to allocate a set of uplink resources of the wireless access interface in which a communications device is to transmit a first uplink signal comprising control information to the wireless communications network,
        to allocate a plurality of sets of uplink resources of the wireless access interface in which the communications device is to transmit a second uplink signal to the wireless communications network, wherein the second uplink signal is to be transmitted a plurality of times, each of the plurality of transmissions of the second uplink signal being a repetition of the second uplink signal, wherein each repetition of the second uplink signal is to be transmitted in a different one of the plurality of sets of uplink resources of the wireless access interface to the other repetitions of the second uplink signal,
        to determine that the resources of the first uplink signal at least partially overlap in time with the resources of at least one of the repetitions of the second uplink signal,
        to receive one or more of the plurality of repetitions of the second uplink signal from the communications device, and
        to extract the control information from a selected one or more of the received repetitions of the second uplink signal, the control information having been multiplexed by the communications device into the resources of the selected one or more of the repetitions of the second uplink signal,
    wherein a characteristic of the resources of the selected one or more repetitions of the second uplink signal, including at least a size thereof, satisfies a predetermined condition.

* * * * *